(12) United States Patent
Vigna

(10) Patent No.: US 12,438,881 B2
(45) Date of Patent: *Oct. 7, 2025

(54) DASHBOARD AND REPORT WIDGET LAYOUTS WITH VERSIONING FUNCTIONALITY FOR MULTIPLE DISPLAYS AND CLASSIFICATION OF DATA SETS AND INPUTS

(71) Applicant: David Michael Vigna, Sterling, VA (US)

(72) Inventor: David Michael Vigna, Sterling, VA (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/454,313

(22) Filed: Aug. 23, 2023

(65) Prior Publication Data

US 2023/0396629 A1    Dec. 7, 2023

Related U.S. Application Data

(63) Continuation-in-part of application No. 17/807,981, filed on Jun. 21, 2022, now abandoned, and a continuation-in-part of application No. 17/658,746, filed on Apr. 11, 2022, now Pat. No. 12,294,597, and a continuation-in-part of application No. 17/448,998, filed on Sep. 27, 2021, said application No. 17/807,981 is a continuation-in-part of application No. 16/946,460, filed on Jun. 23, 2020, now Pat. No. 11,368,466, said application No. 17/658,746 is a continuation-in-part of application No. 15/929,388, filed on Apr. 30, 2020, now Pat. No. 11,301,241.

(60) Provisional application No. 63/374,810, filed on Sep. 7, 2022.

(51) Int. Cl.
H04L 9/40        (2022.01)
G06F 3/04817    (2022.01)

(52) U.S. Cl.
CPC ........ *H04L 63/104* (2013.01); *G06F 3/04817* (2013.01); *H04L 63/0263* (2013.01); *G06F 2203/04806* (2013.01)

(58) Field of Classification Search
USPC ....................................................... 707/736
See application file for complete search history.

(56) References Cited

U.S. PATENT DOCUMENTS

| | | | | |
|---|---|---|---|---|
| 9,503,422 B2* | 11/2016 | Al-Khowaiter | ..... | H04L 63/0245 |
| 2015/0101026 A1* | 4/2015 | Kraus | ..... | H04W 4/21 |
| | | | | 726/4 |
| 2018/0115652 A1* | 4/2018 | Russell | ..... | H04L 41/5067 |

(Continued)

*Primary Examiner* — Baoquoc N To
(74) *Attorney, Agent, or Firm* — Dunlap Bennett & Ludwig, PLLC

(57) ABSTRACT

A dashboard and report widget layout with versioning functionality for multiple devices and location displays addressing a complex role-based matrix and data set input classifications. The present invention may add a testing module for selecting different shared versions of report widgets for a more complete development, testing and deploy life cycle. The present invention also includes network discovery and monitoring, and our data model includes device and location linked to user tokens and tags to track user activity. This allows for browser to database user tagging and tracking allowing for front end to back-end audits and allow for more fine grain access controls.

20 Claims, 26 Drawing Sheets

(56) References Cited

U.S. PATENT DOCUMENTS

2020/0162315 A1* 5/2020 Siddiqi .................. H04L 41/22
2021/0409549 A1* 12/2021 Russell ............. H04M 15/8083

* cited by examiner

DASHBOARD AND REPORT WIDGET LAYOUTS WITH VERSIONING FUNCTIONALITY FOR MULTIPLE DISPLAYS AND CLASSIFICATION OF DATA SETS AND INPUTS

CROSS-REFERENCE TO RELATED APPLICATION

This application claims the benefit of priority of U.S. provisional application No. 63/374,810, filed 7 Sep. 2023, the contents of which are herein incorporated by reference.

This application claims the benefit of priority of U.S. non-provisional application Ser. No. 17/658,746, filed 11 Apr. 2022, U.S. non-provisional application Ser. No. 17/807,981 filed 21 Jun. 2022, U.S. non-provisional application Ser. No. 17/448,998 filed 27 Sep. 2021, to U.S. Pat. No. 11,301,241, issued 12 Apr. 2022; to U.S. Pat. No. 11,368,466, issued 21 Jun. 2022 as a continuation-in-part to each, the contents of all are herein incorporated by reference.

BACKGROUND OF THE INVENTION

The present invention relates to dashboard and report widget layouts, and, more particularly, to a dashboard and report widget layout with versioning functionality for multiple functional display devices and also includes location and network discovery and user activity monitoring to secure sensitive data sets.

Webpages and dashboards may contain different data feeds to receive updated data from various data sources. A charting widget is a pre-designed, interactive element that can be added to a website and dashboards to display disparate data sets from the data feeds in a visual format, such as a bar chart, line graph, pie chart, or scatter plot. The charting widgets may use JavaScript™ libraries or third-party applications that can be embedded into a webpage.

A report developer may desire that the embedded charting widgets be grouped and displayed differently for each group viewing the data based on the functional use of the dashboard or webpage, device, screen size, and the use of the webpage or dashboard.

The present invention includes a testing module for selecting different shared versions of report widgets for a more complete development, testing and deploy life cycle.

The present invention includes network discovery and monitoring, to expand the inventor's earlier patent "Enterprise Reports, Error Handler and Audit Compartmentalized by Web Application" (U.S. Pat. No. 11,301,241B2). The present invention provides a data model that includes device and location linked to user tokens and tags to track user activity and expand the access controls and reporting. This allows for browser to database user tagging and tracking allowing for front end to back-end audits and allow for more fine grain access controls.

Layout Multiple Screens

Different user groups have different display input needs when working on different-sized monitors. Webpages and chart layouts may look acceptable on one monitor, but on multiple screens, the content and message may be harder to read, spanning across multiple screens due to the monitor frame splitting the content with a large line. Here is a list of some standard horizontal or vertical wall mounts or stands for multiple monitors' layouts that may include:
  1 row of 2 screens
  2 rows of 2 screens
  1 row of 3 screens
  2 rows of 3 screens
  3 rows of 3 screens There may be more layouts for wall displays and screens in a command center. Those larger monitors may be normal or widescreen. Those sizes will change pixelation needs, such as where to locate the frame break, and how much space padding is needed to display the report panels.

The dashboard layout of the user interface for each reporting widget has an intrinsic recommended size, wherein a level of detail is required since all screens are not square, or widescreen left to right. Rather, some may be widescreen or top to bottom and will display differently. Dashboards on multiple computer monitors have different screen layout requirement than the webpages with embedded panels. Those embedded panels may include multiple charts, tables, files, and media affected by panel layout resizing limits.

Data Feeds Joining and Classification

The inventor's earlier patent "Data Classification Model of Columns For Web Reports and Widgets" (U.S. Pat. No. 11,368,466B2), incorporated by reference herein, addresses the data classification of a column in a single data source. ColdFusion provides the function to join multiple data sources within a secondary dataset, called query of queries. A scheduled task can run this code and dockers can be used to load a database or create files for data feeds or analysis. "Docker is an open-source project for automating the deployment of applications as portable, self-sufficient containers that can run on the cloud or on-premises." This will allow use of scalability or compartmentalized application datasets, if needed. When pulling data sets from an external application, a method must be used to classify and group the data sets to control sensitive results from multiple feeds being joined together.

As can be seen, there is a need for a dashboard and report widget layout with versioning functionality for multiple functional displays and different data set input classifications.

The present invention uses an embedded map as an example to define which data feed has each classification level. Alternatively, a user can break the markers data into different classification types. For the patent, the present invention defined the sensitive columns in the data model. Moreover, the present invention defines the classification levels of different data feed sources and applies classification by rows when filtering data and creating topics and classifying the filtered data sets.

The present invention includes multiple JavaScript libraries but may not address restricting the data set to protect sensitive data. The data model of the present invention is configured to parse the data to the charting libraries needed to address access controls and limit the optional charting marker data point display text.

to the present invention provides a detailed level of zone awareness and address different trust levels for different devices used in multiple locations. The location could be in a secure office setting or mobile in the field using a public network.

Rapid Development—Requirements to Dashboard Deployment

Most projects take time to gather requirements on the how the current business processes input from data sources. There are requirement meetings to gather what data is used and how the business uses the inputs and what outputs they are currently use for reports. Each step is reviewed step by step. Technical teams are then included to in the next phase after all the requirements have been gathered. The servers are built and demo reports and layouts are created with the company data and user access are defined as the layouts of the dashboards are being defined.

This process can be timely and does not address the need for internal and external development teams to be included and still protect the sensitive data during the development phase of creating dashboards with sensitive data. The modeling and layouts of different report widgets may include both public and private sensitive data that you would not want shared with external development teams or server admins.

Address Escalated Permissions

A dashboard developer may also need a method to address server admins, helpdesk, developer and privileged users have too much access to data. The escalated permissions that the privileged user needs sometimes to completed their duties. But those permissions are not a daily duty but only needed periodically for troubleshooting issues or for debugging in the case of the developer team and temporarily need as different units are working together on a specific task or project. There need to be a simple way to temporary switch on and off those escalated privileges to limit the access to sensitive date within the systems.

SUMMARY OF THE INVENTION

The present invention focuses on report layouts and access controls for dashboards that display on multiple screens of different functional groups. Accordingly, the reports need to use different layouts due to the screen size and functional role of the users or the use of the displaying device.

The present invention also addresses sensitive data, which is included within the embedded content of those panels and charts.

The present invention provides a method to classify and tag data coming in from third-party open applications and join more sensitive data with the charting library.

The present invention addresses both normal and temporary escalated permissions that will limit selection of the whole dataset to just a limited time range. This will restriction for querying data for the replay or a limited-time range to replay issues for wall displays and data analysts and provide situation awareness to people in the field.

The present invention also includes a testing module for selecting different shared versions of charting or reporting widgets.

In one embodiment of the present invention, an embedded map may be used to define which data feed has each classification level.

In one embodiment of the present invention, markers data are broken into different classification types.

In one embodiment of the present invention, classification levels of different data feed sources are applied by rows when filtering data to create topics and classify the filtered data sets.

In one embodiment of the present invention may include multiple JavaScript™ libraries, but they do not address restricting the data set to protect sensitive data. The data model of the present invention parses the data to the charting libraries needed to address access controls and limit the optional charting marker data point display text.

These and other features, aspects and advantages of the present invention will become better understood with reference to the following drawings, description and claims.

BRIEF DESCRIPTION OF THE DRAWINGS

FIG. 1 is a diagram of a conference dashboard—split on multiple screens in the conference room, they span multiple monitors. The navigation menu is displayed for this example, and the lines represent the edge of the screens.

FIG. 2 is a diagram of a tabbed report widget—displayed on a monitor in edit mode with a comment entry form; the current comments are displayed on the right side. The top comment is not displayed because it is restricted. This current user does not have access based on the user's role and classification level for this event.

DETAILED DESCRIPTION OF THE INVENTION

Figure 3A:
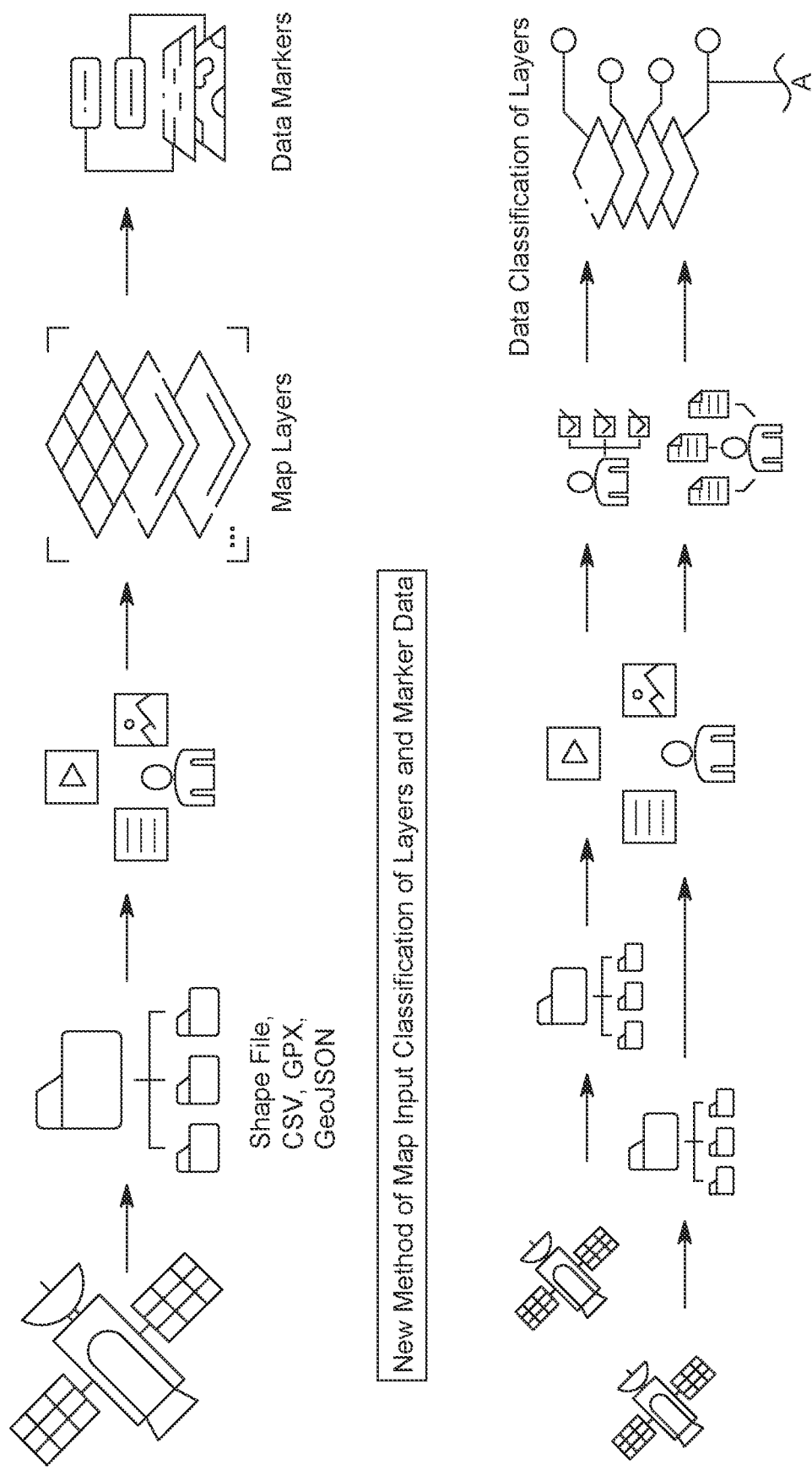
FIGS. 3A-3B are diagrams of the method of pulling Satellite data and creating different map layers with data markers and the workflow of the process.
Figure 3B:
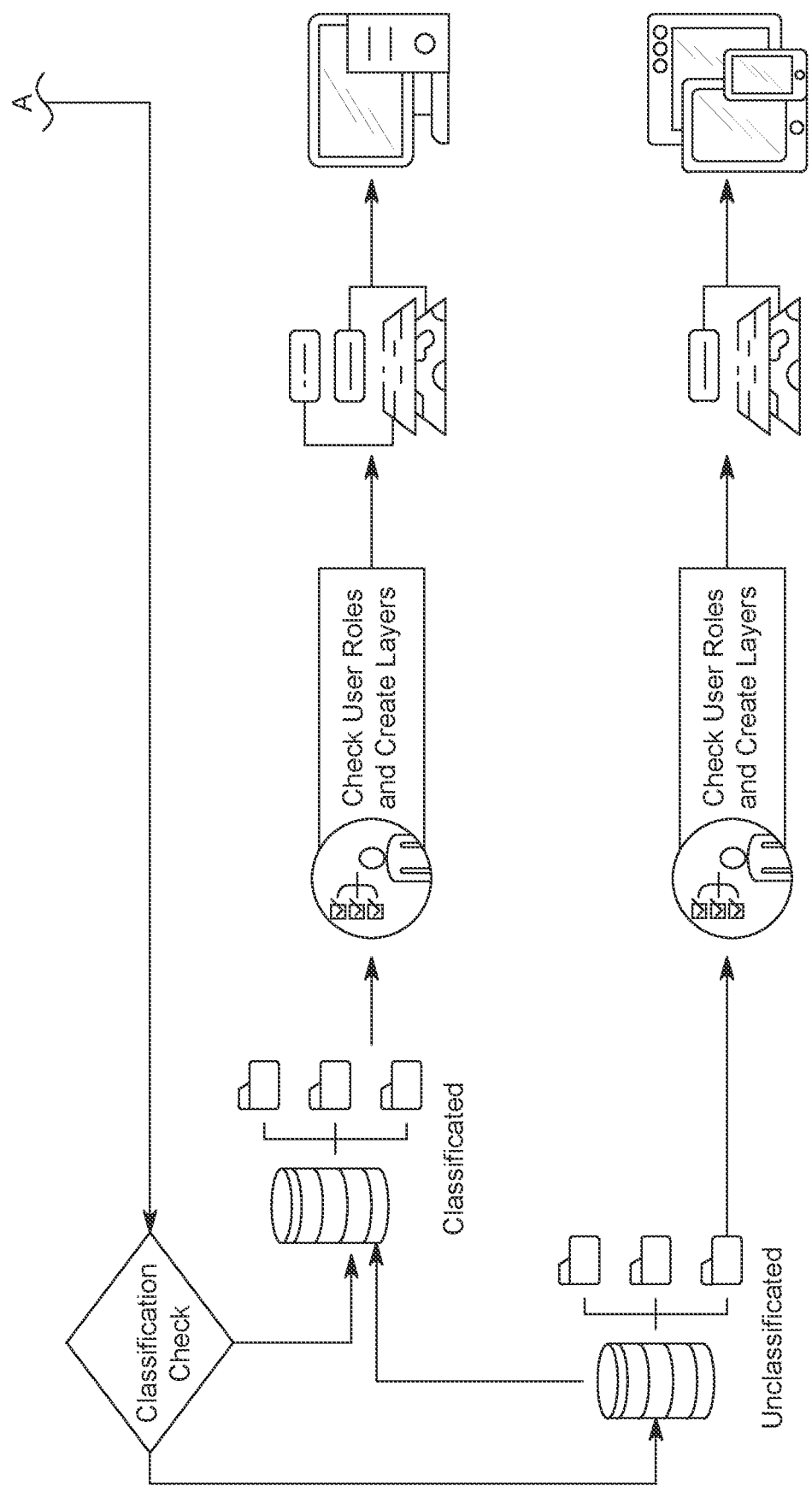
Figure 4A:
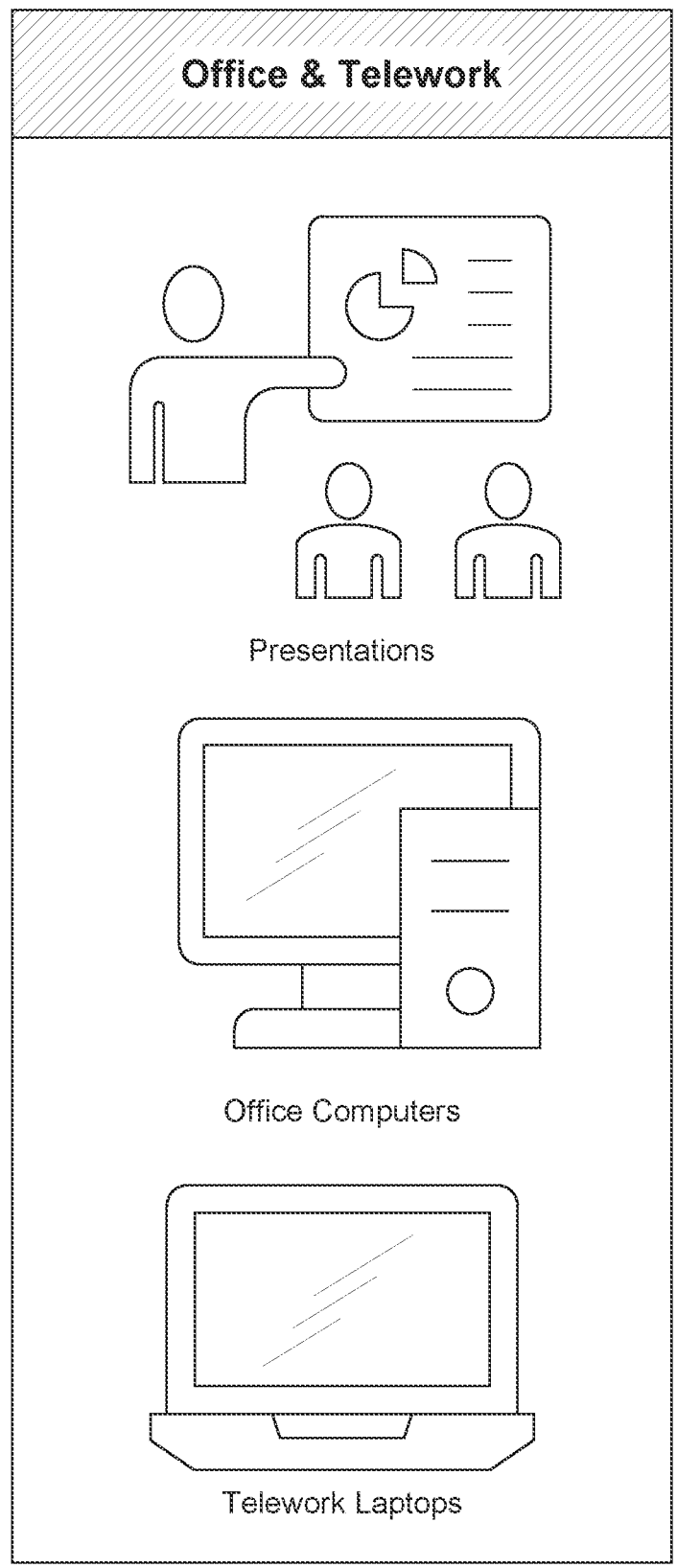
FIGS. 4A-4J are diagrams of the dashboard layout version and map input classification of layers and marker, and the different elements used within the other cross-referenced applications and patents.
Figure 4B:
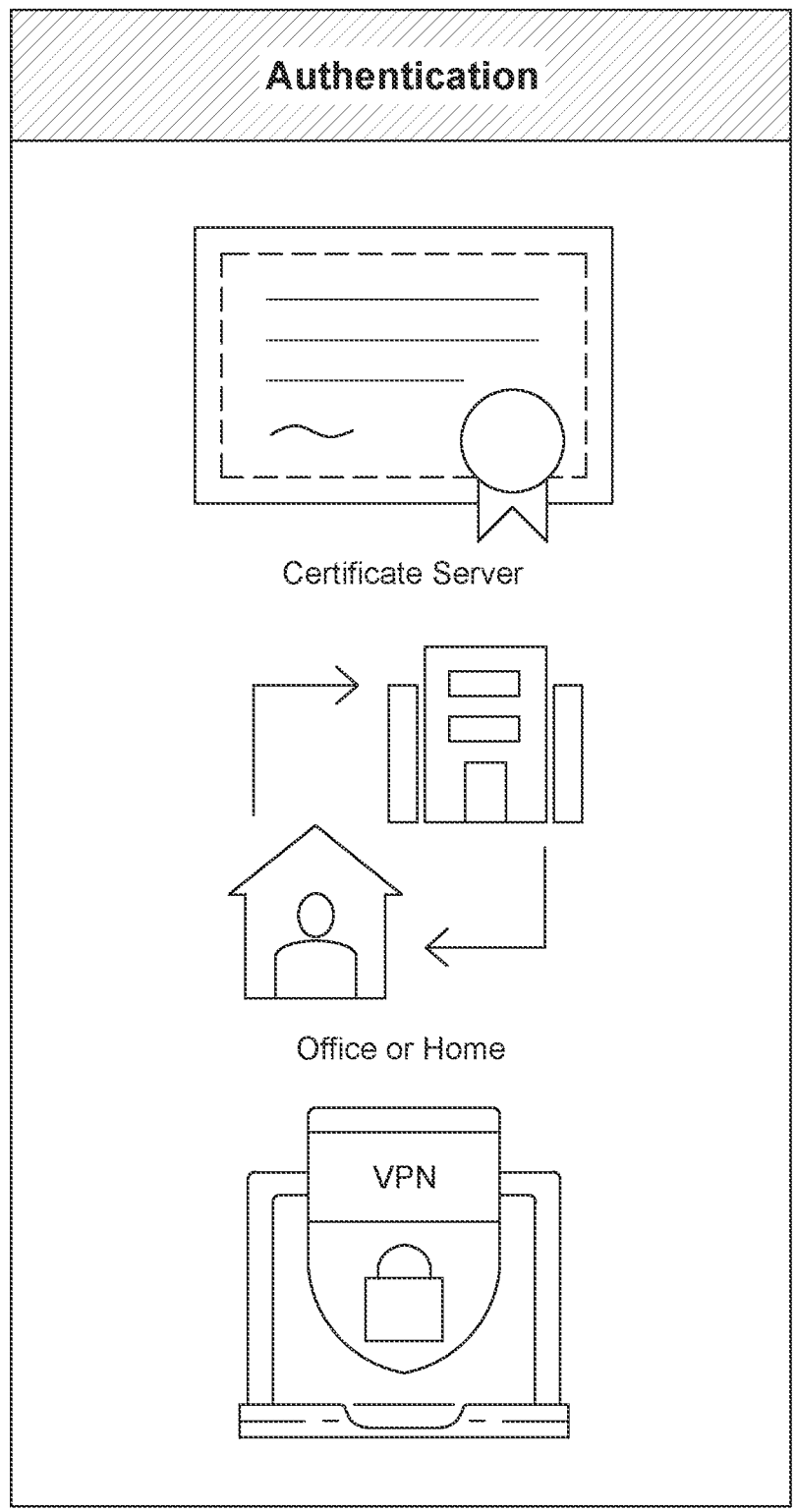
Figure 4C:
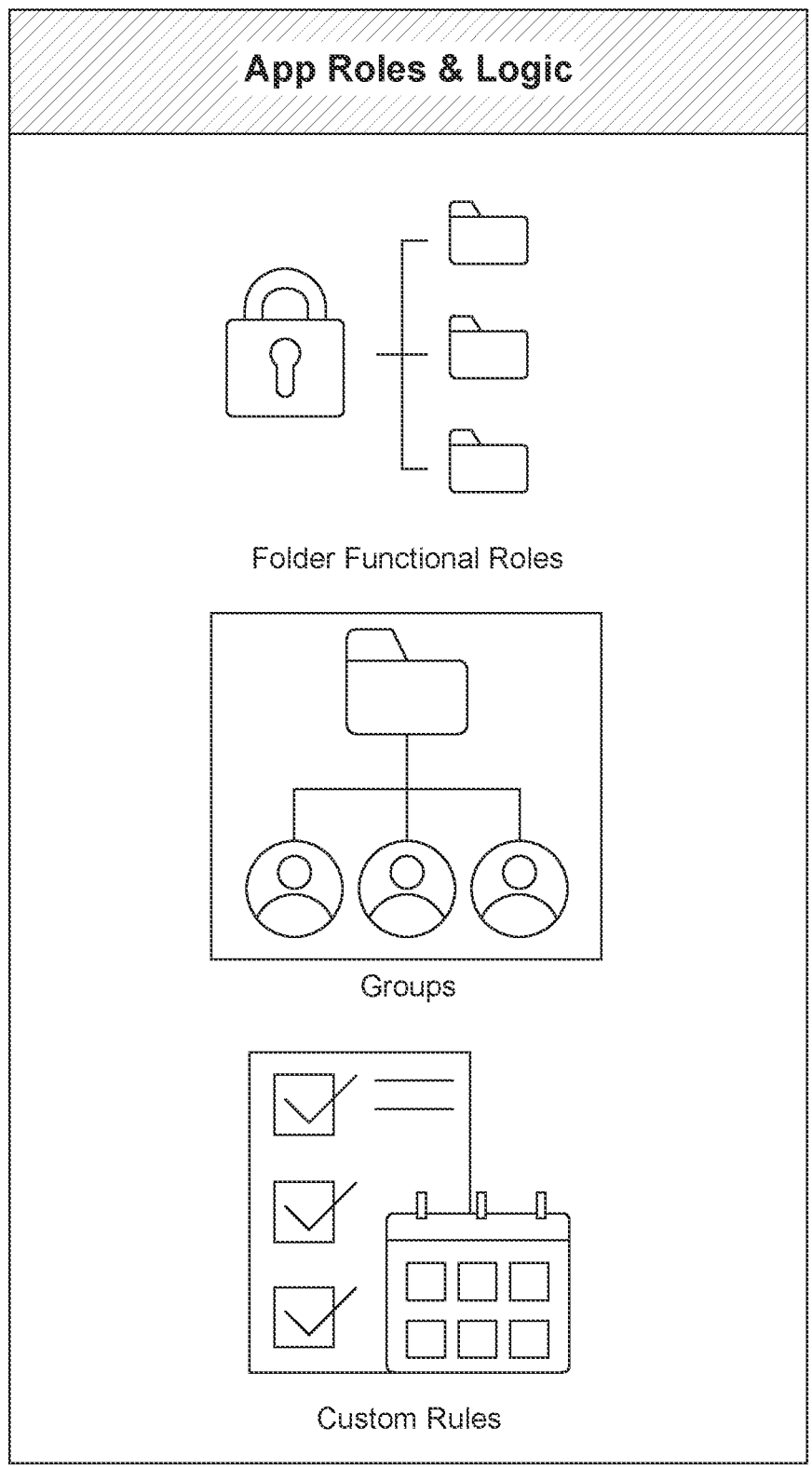
Figure 4D:
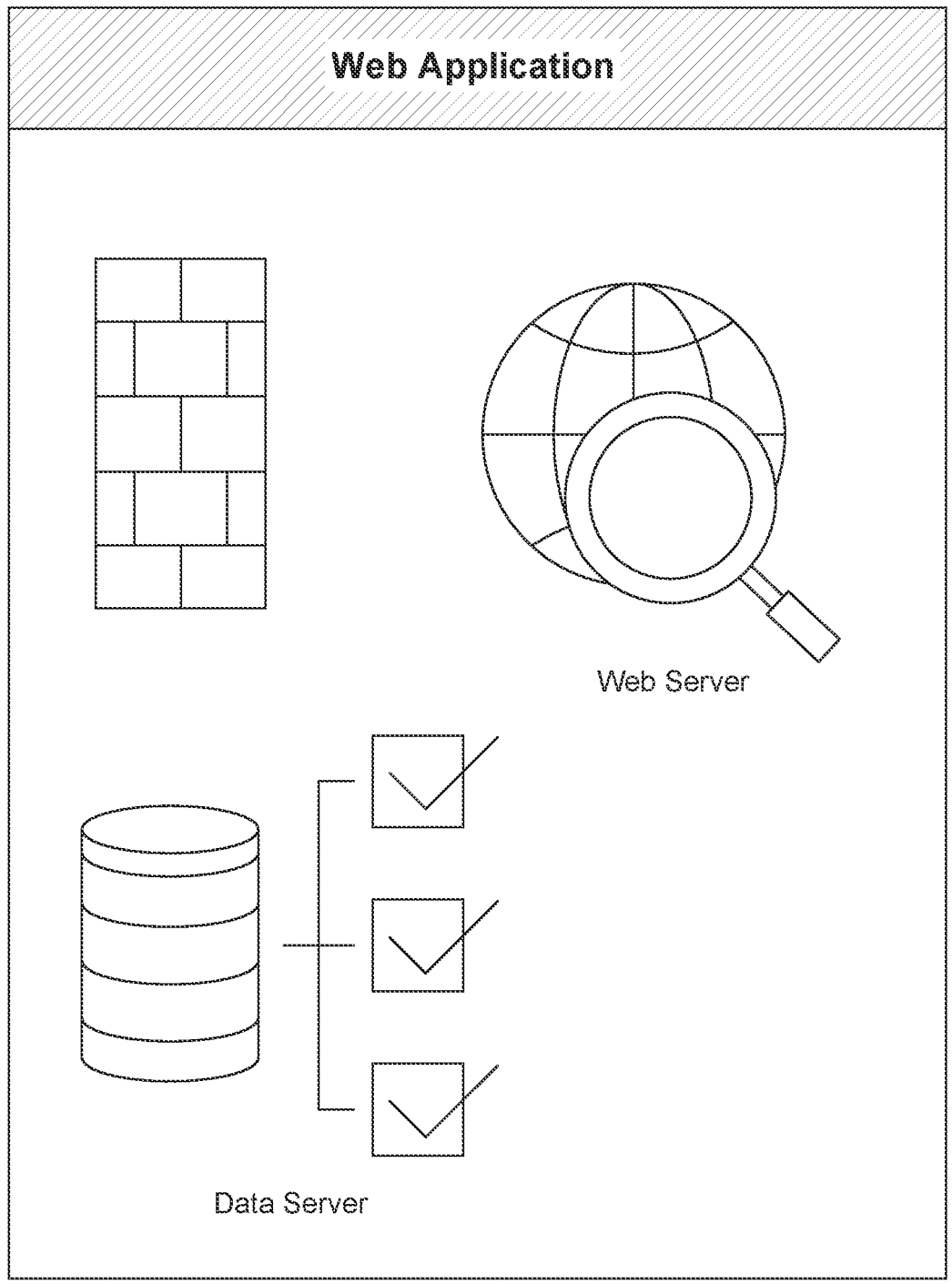
Figure 4E:
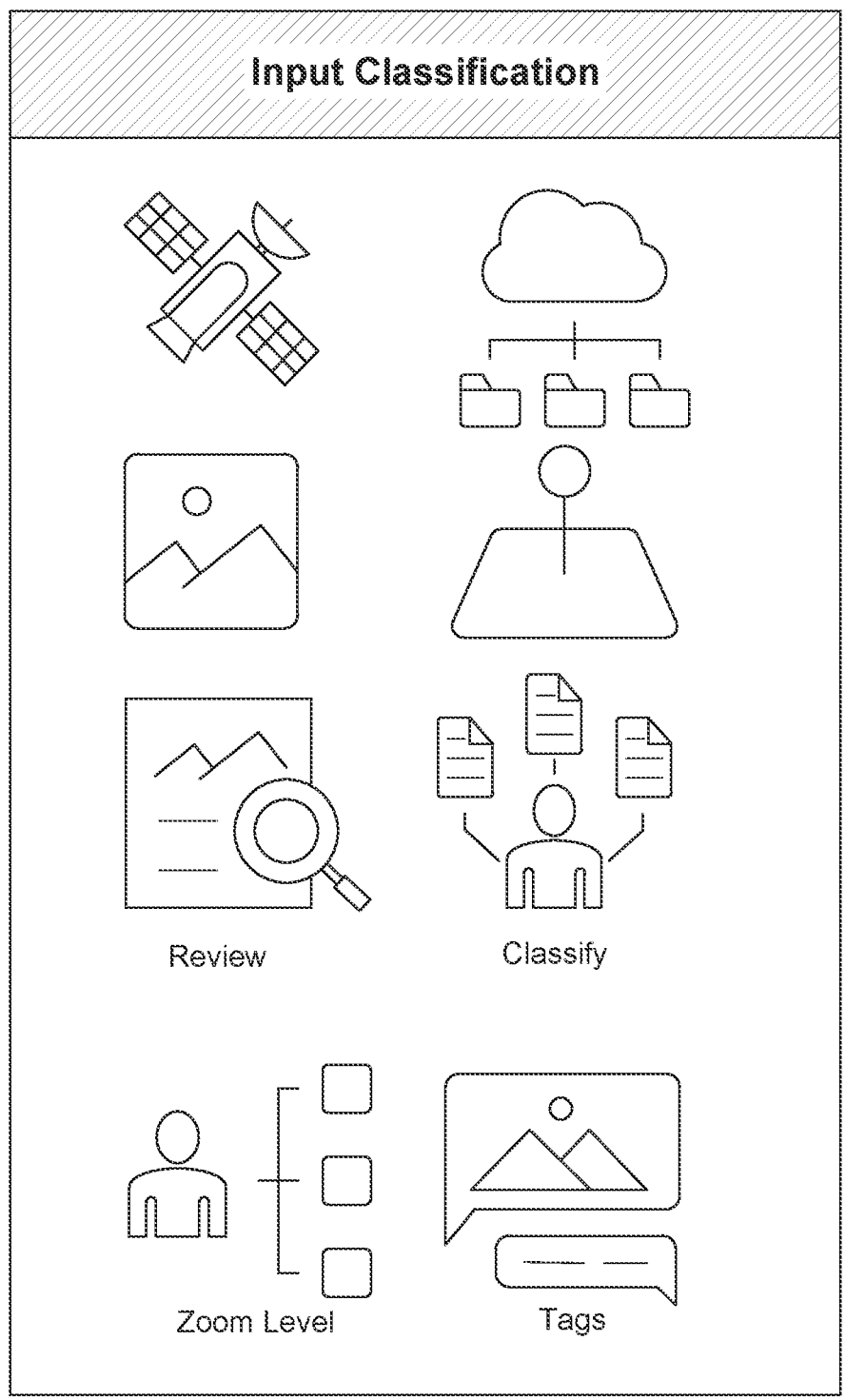
Figure 4F:
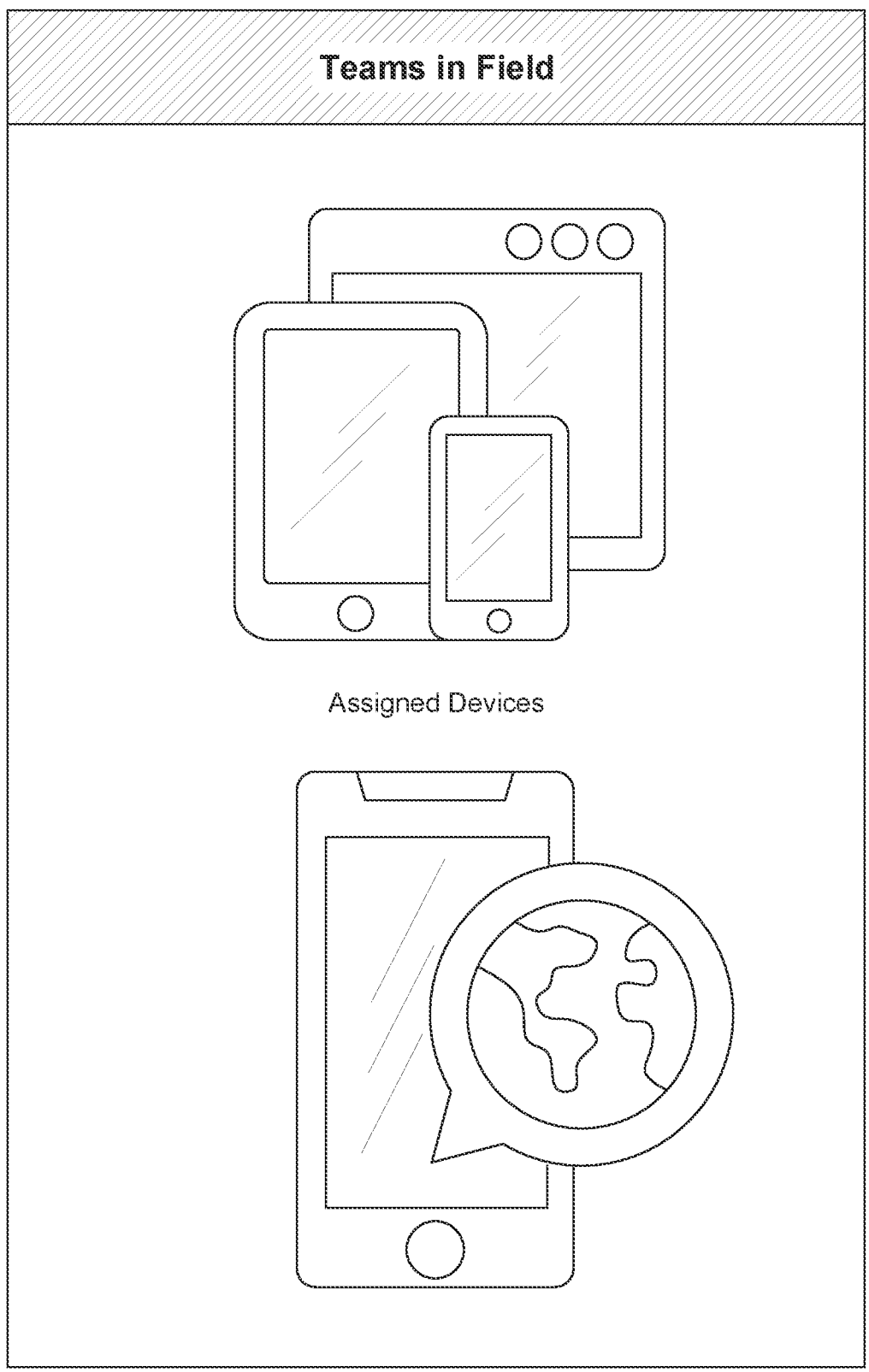
Figure 4G:
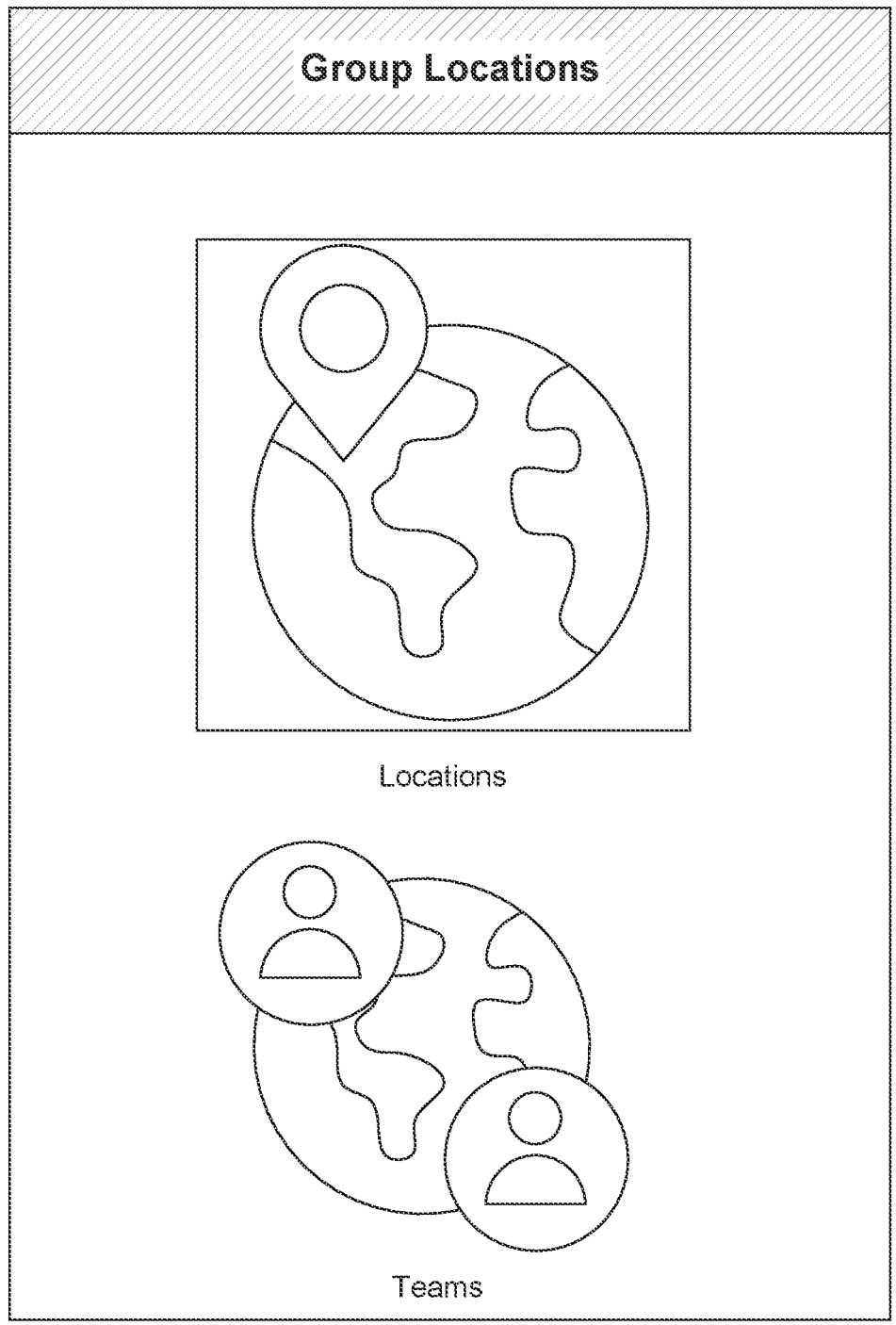
Figure 4H:
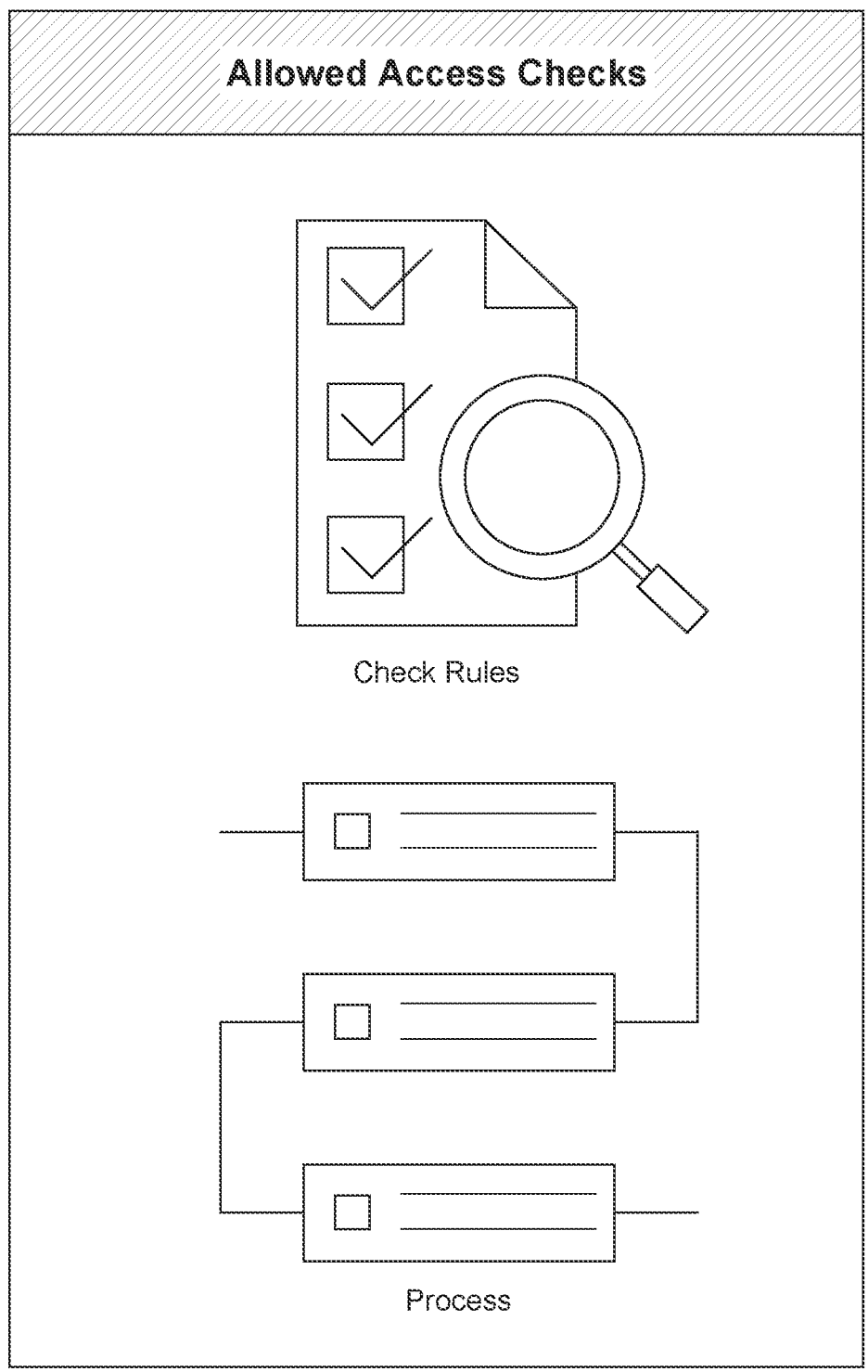
Figure 4I:
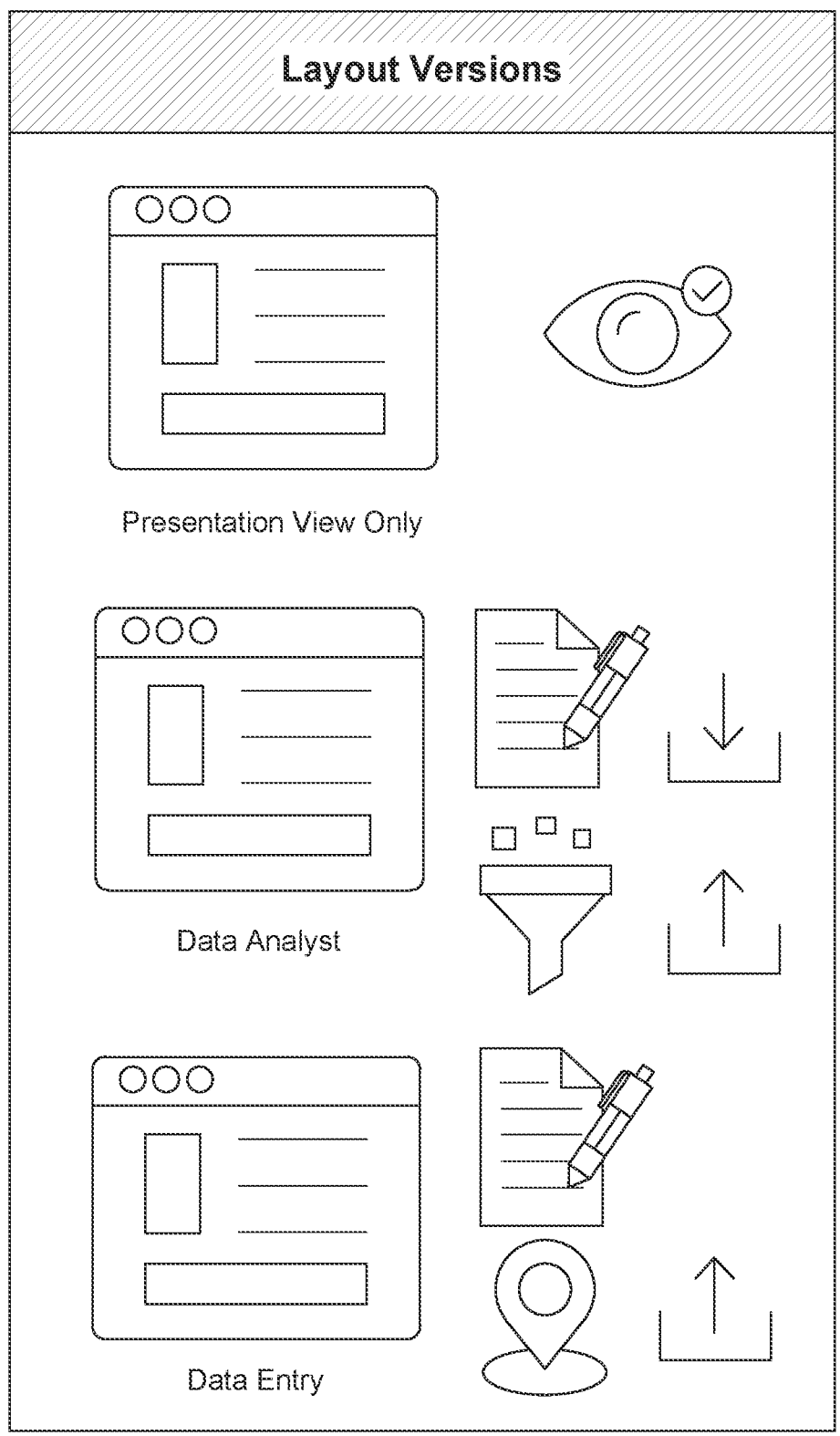
Figure 4J:
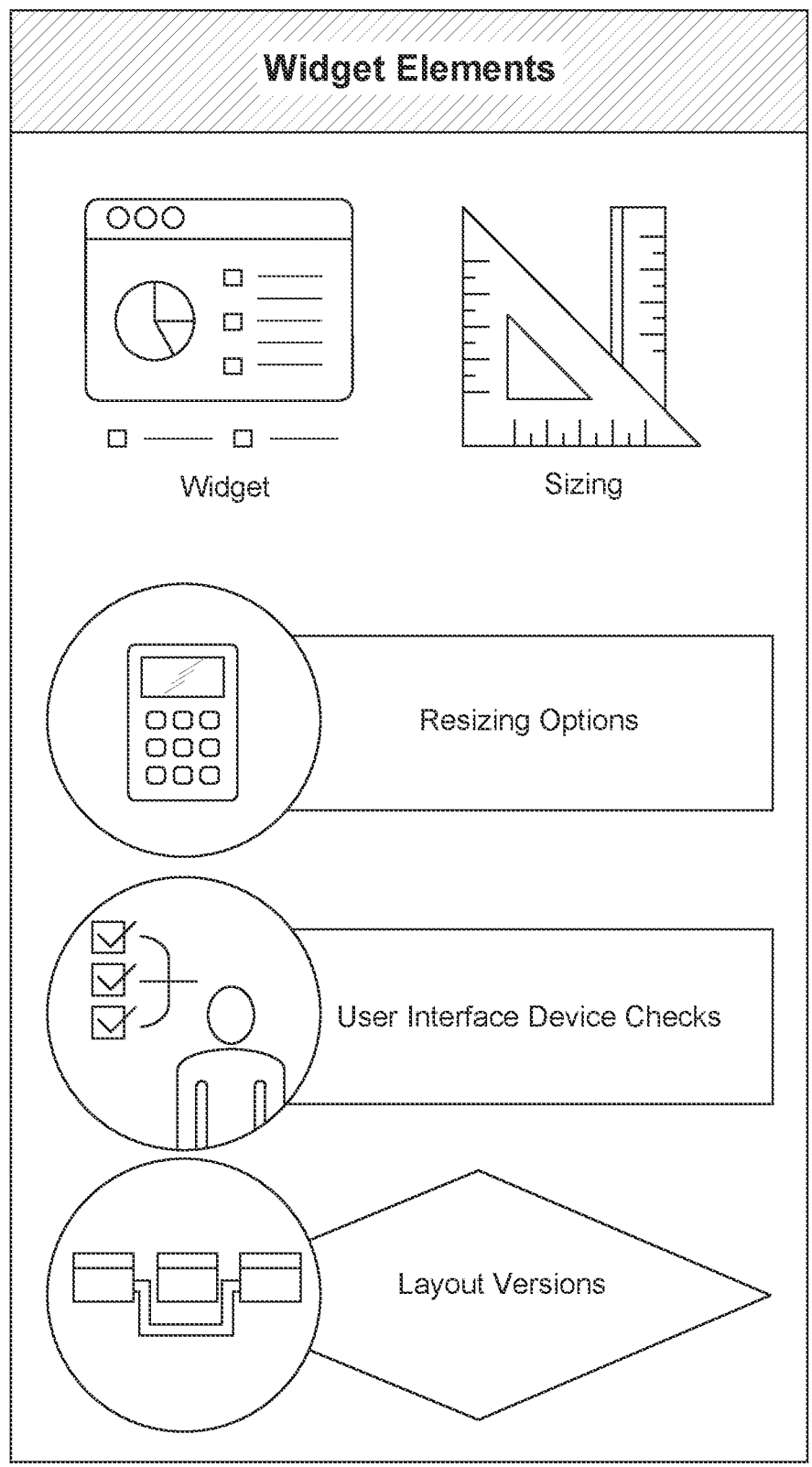

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Webpages and dashboards may contain different data feeds and charting widgets, and they may use JavaScript libraries or third-party applications. When displaying them in panels, the widgets may not display correctly scanned across multiple screens or different screen sizes and panel content where size display is important.

The present invention also addresses sensitive data, which is included within the embedded content of those panels and charts, through a method to classify and tag incoming data from third-party open applications and join more sensitive data within a reporting widget or frame (e.g., videos, photos for maps, and chart libraries).

When resizing, the content can be distorted due to minimum stretch or frame controls of the media and widgets. The versioning functionality of the present invention enables layouts and widget versioning used by different functional groups and the roles.

The present invention contemplates a Conference Dashboard a team uses for traveling to upcoming conferences. The Conference Dashboard has embedded a table, calendar, and charts. The Conference Dashboard provides an embedded map widget with a plurality of the layers of different sensitive data that can be contained in an embedded map.

The Conference Dashboard could be for a Command center with different events, a business sales force traveling to different conferences, or a weather center. The possibilities are not just limited to conferences but can also include scheduling resources for those events and the like. The Conference Dashboard, on a high level, enables the controls and data classification of the data sets used within the reporting widget, and the dashboard layout for different audiences.

Figure 1:
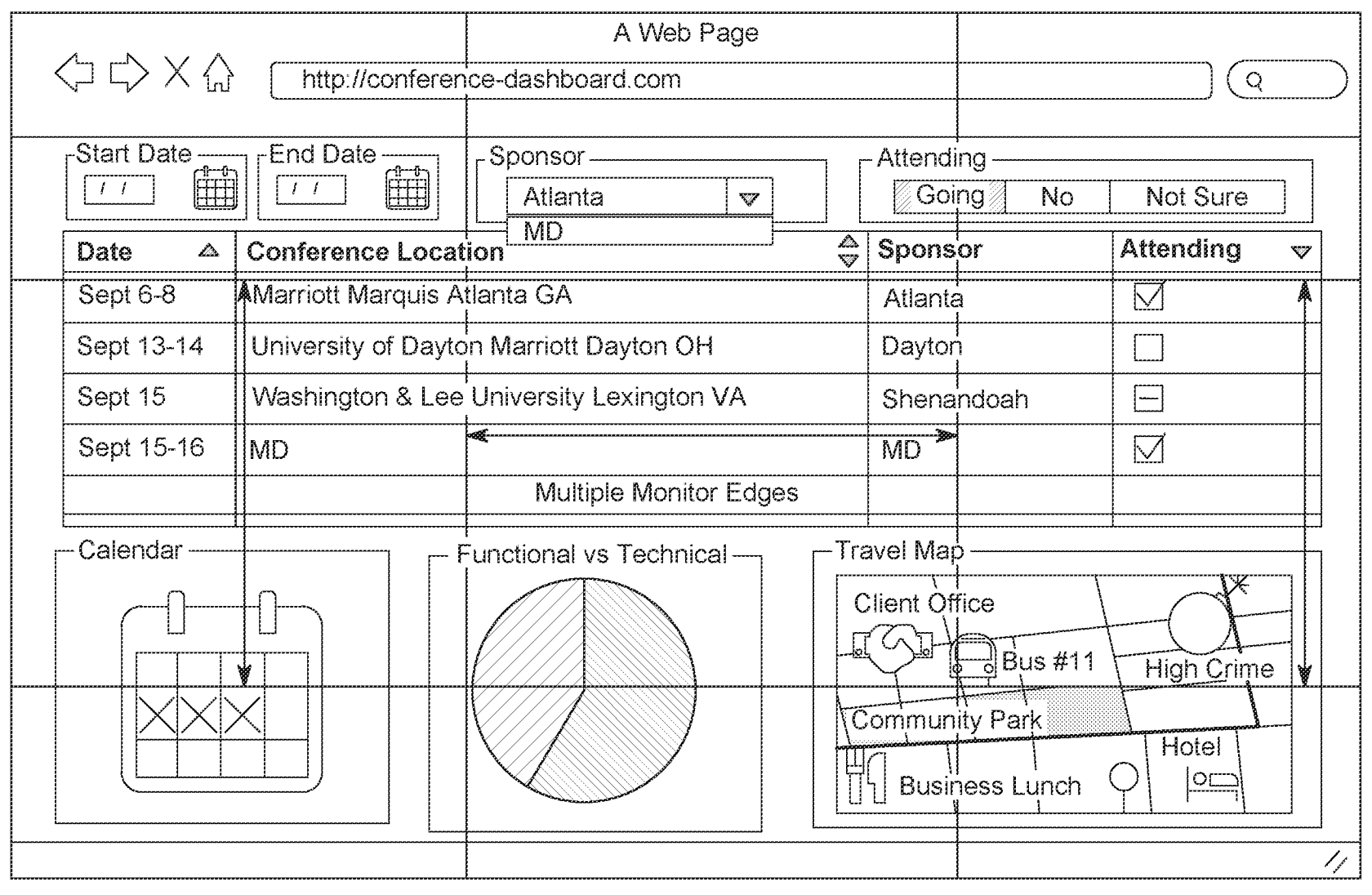
Figure 2:
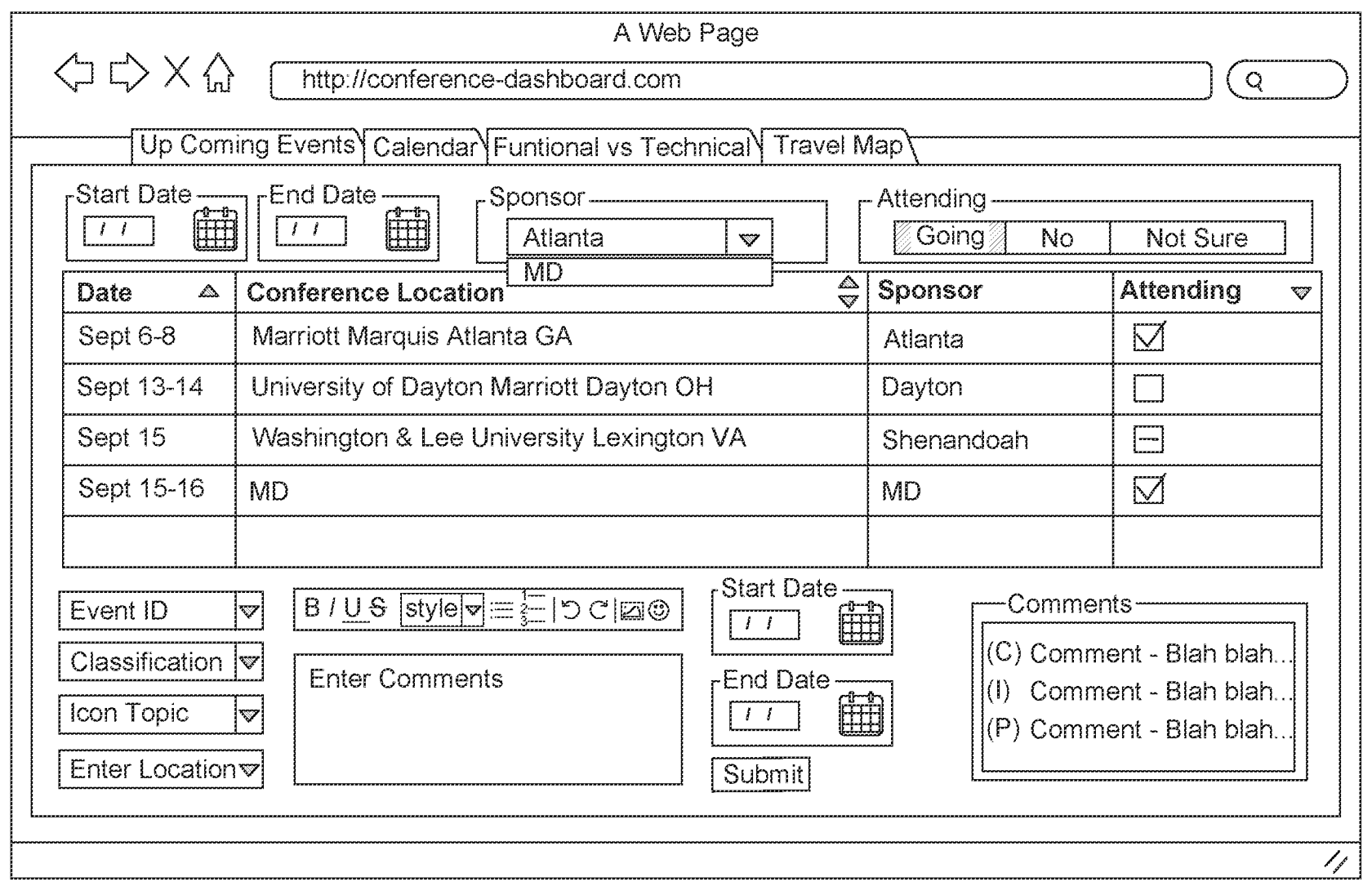

FIG. 1 displays examples will be a Presentation in a Conference room on multiple screens or at an office desk. FIG. 2 is a tabbed dashboard that can be used at a desk by a data analyst or someone in the field with a form that enters comments, notes, uploads photos, or scanned documents.

FIGS. 1 and 2 display modes will range from Presentation, Analyst, to Data entry mode with mapping or streaming media, and sensor input tagged as classified or unclassified without going into the details of different sensitivity levels.

Different use cases may have different display layouts containing the same data. Before turning to the layout widget, the Conference Dashboard layout must first know what widgets are available to include within a dashboard group. A data model and trust model, enabled by the present invention, is configured to control this. The applicant defined the data sources in the Data Classification Model of Columns For Web Reports and Widgets patent.

Data Feeds Classification and IP Zones

The present invention expands the data being classified that is not defined by the data source so that layouts of dashboards on different devices can be grouped by functional uses.

The present invention joins open-source third-party application data sets and sensitive data sources. The inventor's published patent application entitled "Data classification model with key store for import, storage, export and security compliance end points checks" (Pub. No. US20220337404A1), incorporated by reference herein, described the source data and how to map and classify to create a trust level for those feeding data sources that may or may not have encryption keys during the import. The present invention also defines an IP zone for the endpoint, since this may be an external system, encrypting data transfer and passing user tokens to authenticated and monitor user on the endpoint activity expanding the "Method of implementing enterprise cyber reports" (Pub. No. US20220377092A1), incorporated by reference herein.

The additional external data sources may include APIs, streaming media, third-party applications, files in folders, local, network, or cloud buckets, and sensor data accessible by the web server. At a high level, the tables used to define the classification of those external data sources not defined as a data source with the ColdFusion administration pages.

A central repository is provided to document an application's many different data connections. The central repository embodied in a legacy coding method at the page level, allowing for easier management and defining standard tagging or filters of those external data elements, documents, or media.

The present invention enables data elements to be entered into a form to store in the present invention's data models, allowing selection and classification for different sensitivity levels from those external connections. This can be good for media that does not have a data filter or tags.

An example may be mapping data, security cameras, a sensor or element having an event in need of classification at a different level than the element's primary classification.

The present invention enables an analyst to reclassify and transfer the data or file to a different classification bucket.

One method of creating multiple map versions is to have a map and create the layers. For the map, add each layer to a map and save and rename each clone as each new layer is added. One map may contain five layers at a sensitive layer, and another may contain seven layers that add even more sensitive data.

Some mapping tools use a URL and UID parameter to connect to a specific map. The problem is that if a user is reviewing the connection string, it is impossible to read the URL string and the linking map using a UID string and know which map the user is connecting to. Thus, the user must log in to the mapping server, find the map name, and copy the URL code needed. The connection string with a UID does not tell the user which classification version they were connecting to or the map's name, making it hard to manage. The user could create a table, store the connection string values, and use a switch-statement to grab the correct level for each user's levels. The user, however, will still need to version each map made—one will need to create four versions if they have four security levels. If a user has a hundred base maps, they will need to have 400 maps and update four versions when you need to update one lower layer of the map. This is not a practical method for handling large map libraries, and there needs to be a simpler method for managing larger libraries. The inventor researched JavaScript mapping libraries and created a few different methods to handle this problem.

Mapping Tools Example (ERSI)

A method for Mapping Tools Example (ERSI) to create the maps with the joining data layers utilizes the following steps:

ERSI Map Step 1—Create the Data Sets for Different Classification Layers

First create the different data sets in the database and load them into the tables for the database used by the mapping software. Next, views are created for the different data topics by layering data sets with filtering for different classification layers. For example, the topic for layer two is roads: one road layer for each of the four classifications one wants for the roads. The operational layers are created for the whole globe. Remember, the user is stacking four layers for each topic for all classification layers. Also remember, the one thing that cannot be done the same way is the photos for the base map; rather, a table needs to be created with labels for the current image, the grid of the map, and classification tag information to switch the base map image. The mark points are layered by groups, and you define the zoom level to see the data.

ESRI Map Step 2—Zoom Level and Operational Layers

A table is created, and forms are used to enter data for zoom, scale, zoom levels, and operational layers UIDs. The following are details needed from the ERSI site for the layers and marker points.

The layers=parameter accepts a single item ID or multiple item IDs. For multiple layers, use a comma-separated list of IDs (&layers=<itemID>,<itemID>,<itemID>).

In Map Viewer Classic, the point is added to a new map notes layer at the specified x,y coordinate location.

The <x> and <y> coordinates are required to add a point.

Be sure to encode the title, icon, and label parameters.

You must add properties in this order: marker=<x>,<y>, <wkid>,<encoded title>,<encoded icon URL>,<encoded label>.

https://doc.arcgis.com/en/arcgis-online/reference/use-url-parameters.htm

Tables are created, and the classified internal and external data can be joined and loaded into the tables and views. Those views can filter the table data to create the different data layers. The zoom level and latitude and longitude coordinates are stored within the tables, so the dataset may include addresses and other elements that can be used to pinpoint a marker location on a map.

The comments field in the interface uses the GPS of the mobile device and allows a location to be entered by the teams, or they can use single line addressing. The data analyst form allows for comments to be entered and includes edits for the location fields, classification level, and a zoom level to correct data from other teams in the field.

Importantly, the form is for entering the data, taking photos via a smartphone or tablet, adding documents, and setting a classification level. They also have a selection so the user can enter a simple zoom level. This could be a selection, slider, radio buttons, or as simple as a two-choice toggle on mobile devices. When the user is allowed to set the zoom level, the comments can be focused on what they see next to them or what is around them in the greater area. This could be bad weather or any other event that they are reporting on.

Teams within the zoom level can provide that zoom level information if they have the correct security level and are traveling or stationed within that area. They will alert the other teams of any danger examples could include weather and storms or other events they should be aware of so the comment can alert other teams.

ESRI Map Step 3—Checking the Comments and Zoom Levels

The prior art method builds the map from the ground up, but that is the backward way to do it, as it includes selecting the comments first, checking the data set and seeing what zoom level you have. Sure, there is a function that checks the zoom, but if a user uses single line addressing to set the location and no data returns, this is a problem.

Step 3 checks if latitude and longitude data is missing. The process works through the data set check in a defined workflow. An example may be as follows:
1. Check simple address
2. Check latitude and longitude
3. Check City
4. Check Country, etc.

The process includes working up the levels of information until valid data values are reached. The zoom level is then checked to match the data set level. If only a country code is provided, the zoom is geared to a country even if the zoom level is defined as a town. Remember, the comments or any document may be defined at a zoom level.

https://developers.arcgis.com/documentation/mapping-apis-and-services/reference/zoom-levels-and-scale/

The present invention queries the data using a Data Classification Model (pieces of information and drill down may not be included due to some restriction or missing data within that records set).

The user's role is checked, and the base map image is selected per the user's classification level. The parameters for zoom are now set to the level of the data available to the user.

Next the data is queried to get the data layer UID the user should have access to for their classification level and the zoom level of the data.

The URL can be built for the user's access level, and the data sets classification and zoom level for those comments.

JavaScript Mapping Libraries

A novel method utilizing JavaScript Mapping Libraries to create the maps with the joining data layers includes the following:

JavaScript Map Step 1—Classification of the Connection String

ColdFusion has a few different functions that can create, read, and write to directories in different file formats. Examples are not limited to spreadsheets, CSV, XML, or JSON. The present invention focuses on a simple API for the present invention's connection string.

The present invention may create a Form and Tables that store ColdFusion's variable fields to create a connection API, JSON, or other data online. The connection string and the elements within the data set can be defined within the Data Classification model tables. The present invention may classify the connection and assign it an IP Trust Zone discussed within the Method of Implementing Enterprise Cyber Reports.

JavaScript Map Step 2—Apply Filters and Classify the Data Sub Set

The data source name can be used, and the filter condition can be created to create a data sub-set to group data results within classification levels. This would be a SQL where-clause for filtering and focusing data sets. An example would be where some field equals a value for grouping by department, state, or region. This classification is up to the client—the idea is to group the data by a topic and classification.

Then data classification may be applied to an API or application data. The process may include defining smaller result sets by filtering and tagging the data that would identify those items desired to restricted by adding those classification codes to the data set result of the data pull. The connection string may also use a different URL, API key, or token. Keywords may be used to filter data and group the different data sets. The stored variables are used to create the files to query the data.

The new method also defines the IP Zone of Data Sources discussed in the Method of Implementing Enterprise Cyber Reports patent application and also allows for a user to define an encryption key if needed, as disclosed in the Data Classification Model with Key Store For Import, Storage, Export and Security Compliance End Points Checks patent.

The classification codes and IP Zone tags are used when joining the different queries so that a user can define the layers, group the data, and restrict higher classifications from rendering within the charts. The present invention classifies the datasets to group the data from different sources based on sensitive levels of the data feed. The user's security level is checked before the files are included to query and create the base data sets for the map and rendering map layers or creating the hover-over information. This restricts the user from seeing the levels up to their classification level and protects the data without having to create multiple charts, thereby the present invention now has data column classification, IP Zone data connection classification, and filtering of the API or data providing a subset classified for markers, tooltips, and hover-overs. This provides an additional matrix of security layers to protect the sensitive data.

JavaScript Map Step 3—Widget Library Clones and Recommended Sizing

First, the present invention creates the widget reports with different options for branding, themes, title fonts, and legends that can be modified with a simple style sheet per entity branding guidelines.

The widget can be created with mock data, and the sizing of the chart can be gathered by an outside developer team. String, Date, and Number values can pull the mock data into the data layers, hover-overs, and tooltips. This widget can then be adjusted for a recommended size and minimum and maximum height and width, which would be stored in a sizing table for each charting option. This allows remote developers to provide basic layout information and recommendations for widget sizing for endless options and example documentation to be used by internal teams. Sample charts can be imported into a charting library, and field mapping can be used to create the data mapping to the elements that the chart uses.

This sample library is the base that is cloned and used to create the widget versions. Sample data is used as placeholder fields for display and used by external development teams, if needed, so they can design with mock sample data. This allows an entity to create a standard sized and themed widget. Each development team can copy (clone) and rename those widgets and assign a data source and application roles and have the same look and feel as their dashboard widgets.

JavaScript Map Step 4—Replace the Mock Data with Data Sensitive Data Set

A list of widgets, charts, and maps is provided—in the Conference Dashboard context a user could select each mock data element and replace the layers for the map with the real data source created in Step 2 when joining the data sets. The user would define the filter topic selected for each data layer marker, tooltip, and hover-over.

The step of locking down the security of the widget is already defined because the file used to create the widget has predefined fields to use the variables used for the classification. The data model mapping is important for the trust level mapping between applications and application roles. The widget is now ready to add to a dashboard with predefined security using the Data Model.

JavaScript Map Step 5—Layout Multiple Screens Broken into Display Devices by IP Zones The dashboard is a single page with panels for each report widget. The most common methods of controlling the content layout on a web page will include the CSS Grid Element, Position, and Responsive web design. Those methods work based on the browser size and positioning of the screen, but some widgets may not be able to display content with a line down the middle. One example is FIG. 1: it has a pie chart with a line down the middle to display the frame of a monitor splitting a chart and making it harder to read.

When coding dashboards or web pages with embedded content, a user may not want a screen split in the middle of the layout could be landscape or portrait. An image may have a monitor frame split in the middle, which may look weird or change the chart's message. For instance, a user may have a map with an image popup expanded on a larger 9-monitor display in an emergency response command center, and the details are cut in the middle of the popup image in a map. The panel display approach can also correct the issue where the user has a table with an address and the column is cut in the middle of the street name, making it harder to read with a split on four screens.

SVG and Location Map Layers Example

Some charting libraries allow custom icons to be used as marker points. Some use image files and others allow Scalable Vector Graphic (SVG) code to be used. For those chart libraries that allow SVG usage for custom marker points, the present invention defines those icons used in the patent Web Framework Designed For Secure Locked Down Browsers. That patent discussed a disabled JavaScript browser, the charting may require JavaScript to run, but the present invention can still modify the code.

The present invention can include the use of the icon repository and create grouped markers for each subject type the present invention is displaying in a map layer. An example is the FIG. 2 diagram of the bus or the person sleeping in the bed. If a user wants to display the bomb alert as a high crime area to the traveler and limit access to see the bus number or locations of the hotels. Maybe a user wants a layer for the client's office or the lunch meeting, so everyone does not know your future or current client.

The present invention may use one common data field to join different applications. For this example, the present invention will use the map using common data fields that may be data layer photos, roads, and buildings. Multiple open-source data sets from the different applications can be joined to create a common data set for the mapping charts.

By way of example, the Conference Dashboard used to schedule traveling and track events may include applications having data sets with sensitive information. Through the present invention a user may layer the map with the open-source data but would like to limit marker data and hover-over information displayed on the map to only the traveling team or managers. FIG. 2 has a comment input form. There is a button to open more address information and to select the icon data type. The user can also enter a start and end date—the end date is optional—and upload photos or files to each comment linked to an event.

Display Devices IP Zones

The device display part of this patent defines custom display devices used by the Dashboard and Reporting Widgets that are not normal workstation monitors. Those devices are grouped by functional use. An example may be a conference or command center. Location information for the PC or Device name is entered into a form and stored in a table. Display devices are linked to a physical network location to allow for different presentation modes to be used based on the device's function and the device's role. Most conference room dashboards use just the user's roles for authentication.

An example would be a wall-mounted TV in the conference room connected to a network jack. The web page for the Dashboard would check the client's name and IP address of the connecting device. Further, it would determine from the IP Zones Table if this device were allowed to connect in Presentation mode. If so, the filter menus or navigation may be disabled. Absent user input, default parameters will be used to query data. Those settings are based on that Dashboard's configuration stored within the Layout Model tables.

Refresh rates can be stored in the table if this device is an unmanned device like a TV in a command center as dashboard presentation mode—view only mode. Or no refresh would be used if the dashboard is used by a speaker as dashboard presentation mode—next slide mode. An example would be in a conference room when someone clicks a link on the screen to the next slide on a second Dashboard page. A user may want a command center TV display to refresh every five minutes and the Conference speaker to move from page to page with a remote handheld clicker. A table allows the user to define the variables for different presentation modes and allows for flexible Dashboard creation and usage.

The IP Zone logic for display devices expands the endpoints check for the Data Classification Model with Key Store For Import, Storage, Export and Security Compliance End Points Checks application. And allows for non-standard displays such as multiple monitor racks or TVs with browsers to be used to display the dashboards with different report widgets. An example use is for presentations in a briefing room, but there are many other uses, including menu boards and ticket counters, in both private and public spaces. The present invention protects and controls which widgets and chart elements are used and the display of hover-over information within the charts.

Shared Elements and Data Subsets

Shared elements and configuration file information are stored within the database. Some other report tools use a file that can be shared between reports. However, there is no versioning information displayed when selecting the files. When creating the file for the web pages, widgets, navigation, filters, and sections, the present invention defines the title, element type, and version dates. The element is then assigned an application and application roles that can view and run the element within a page.

This security model addresses open-source libraries and third-party applications that do not handle access controls. The present invention creates a widget library that multiple teams can share. The element level sharing can be at a database query, report widget, or filter level and pre-populated dashboard. The trust mapping discussed in the security model helps control access and allows for multiple teams to share small pieces of data without having to open the whole database to other teams.

For more security when using external development teams' sample or mock data sets can be used to get sizing and spacing for widget displays layouts of the dashboards. The use of sample or mock data can assist the external teams create a base report library that can be later modified with the real data onsite. Those elements can be used to create the wire frame examples before the client's data feeds are connected.

This breaks the normal software development phase it a process that can run in run in parallel. As soon as the business developer defines the basic requirements. Time period filters and other common elements categories or filters can be defined to split the report widgets to multiple developers. Using a defined sample data can help speed the development process. The report wireframes can be coded to use the mock data as the database team sets up the ETL process and reporting data warehouse.

Versioning of Web Page Elements, Report Widgets, and Dashboards

The shared elements are combined so the layout of panel positions, navigations, filters, and buttons can be used within Dashboard and Web Page Layouts containing reporting widgets. There is a form that allows developers to select active, published, and shared elements so they can change different menus and report widgets for layout design modifications.

The shared Element Library allows the application team to share web elements, data sets, and widgets to limit the full granting of access to their whole database or data feeds. This allows only the smaller subset of dashboard pieces to be reused by the trusted application teams. This can be a one-way trust so work can be completed externally by third-party developers.

Selecting a version number on the fly in a form interface makes mixing and matching different versions of each Dashboard element easy. An example may be a user who has a menu filter with two versions and want to compare the previous version to the newer version. The form will have a drop menu that allows the user to pick menus, filters, and widgets to place in the panel areas for the Dashboard layout.

Panel positions can be defined, and switching out one widget between panels is just a simple drop menu selection for testing the layout. This allows the user to set custom spacing and padding to the display and helps with the layout of the dashboard on multiple split or small screens. The layout is saved to a file, and you now have a template to be used for the same screen device size. No more trying to guess the placeholders for the layout using a template; just replace the data link for your current environment.

The widget report library will easily allow a user to select a report widget to add to many different dashboards with different layouts. The developers can also create reports from the information stored about layouts and report widgets and shared elements. An interface report can tell the user which report elements and widgets are used in the dashboards.

This report about shared Dashboard, widgets, and elements like filters or menus can provide a more complete security assessment to manage the sensitive data. In other tools, report files coded into a web page or xml file do not give a user the same level of access audits and user management. The present invention configures a framework to assist developers and cyber teams to protect sensitive data and help with the collaboration of the different teams involved with development and the security of protecting corporate and agency sensitive data.

Faster Deployments

The normal process of deployment does not use the versioning and shared elements with mock data here is the normal process time line.

Sequential Report Deployment
Requirements Phase
   Who are the user groups?
   What are Inputs?
   What are Outputs?
   How are the current Reports Used?
      Which Reports Does Each Group Use? (Permissions)
Build Servers Phase
   Build and Secure the Servers
Data Phase
   ELT Load Data
   Model the Data
Design Reports Phase
   Design New Reports
Test and Deploy Phase
   User Tests New Reports The use of Mock Data and Prebuilt Report Libraries help to bring the Server and Developer teams and the Report Development sooner into the client's site and overlap with the Business Analysts team. This may not look like the process is faster but running them in parallel allows the teams to be hired and onboarded soon in the Report Development life cycle. Those teams can be included in any requirement gathering meetings that can benefit from the technical advice they can provide. Those teams are not normally included due to the limited workload those teams would have between meetings with clients.

By moving the server build forward once you know the user count and workload of how many servers you may need the build process can start. The sizing of the database is based on the input size not the output so there is no need to wait to define report layouts and group permission before you start to load the data. Here is a simple table to explain the workflow and the benefits of the use of the report libraries and mock data to build wireframe reports for the client and switch to real data securing sensitive data to only the developer teams with the role level and permissions to access the sensitive data.

Parallel Report Deployment

| Requirements Phase | Build Servers Phase |
| --- | --- |
| Who are the user groups? | Once you know user counts. |
| | Build and Secure the Servers |
| | Mock Data Phase |
| | Install Mock Data |
| | Import Report Library |
| | (Open Firewalls and Test |
| | Connections on Servers) |
| What are Inputs? | Data Phase |
| | ELT Load Data |
| What are Outputs? | Model the Data |
| | Design Reports Phase |

| Requirements Phase | Build Servers Phase |
|---|---|
| How are the current Reports Used? | Use Report Widget Library with Mock Data |
| Which Reports Does Each Group Use? (Permissions) | Add Data Classification (Permissions) |
| | Switch from Mock to Real Data |
| | Test and Deploy Phase |
| | User Tests New Reports |

Temporary Role Escalation and Replay Range

Most normal provisioning of permissions for data access would have a simple check for a role. The applicant has expanded data classification model to include a secure level number for a trust level. For this example, the applicant is including a table to show how the coding logic works and expands the data classification patent "DATA CLASSIFICATION OF COLUMNS FOR WEB REPORTS AND WIDGETS" the table as the roles and access level for a normal user and Sam the privileged server admin.

| UserRoles-Table | | | | |
|---|---|---|---|---|
| UserID | Role | RoleLevel | ProvisionDate | DeprovisionDate |
| JohnDoe | HR-Traveler | 2 | Jan. 1, 2023 | null |
| Sam (Server Admin) | HR-Admin (Too High For Normal Use) | 4 | Jan. 1, 2023 | null |

First you select the User's Role and Role Level based on the sysdate to make sure the access has not been deprovisioned.

```
Select Role and RoleLevel
From UserRoles
Where UserID = 'Sam'
And ProvisionDate <= Sysdate
and (DeprovisonDate >= Sysdate or DeprovisionDate is null)
```

The next step in the code would be to check access for the column of data checking the variable of the column's access Role Level number and comparing to the user's access level for that column.

```
Select
If User_RoleLevel >= Column1_RoleLevel
    Column1
Endif
If User_RoleLevel >= Colum2_RoleLevel
    Column2
Endif
From Table
Where report filters condition = ??
```

This is the allows for all the data to be returned in the query which for limited troubleshooting of issues or temporary permissions for a short-term project may grant too much access. The present invention may create a temporary role table that expands the data classification model and address the need for limited permission escalation and a limit time period selection of the data to provide for debugging in the case of the developer team and temporarily need as different units are working together on a specific task or project.

Here is an example of the temporary roles table for the privileges server admin to troubleshoot an issue. The ticket was assigned to them on Apr. 1, 2023 and the issue started a few weeks ago. The Replay transaction range been set to 1 month of data when the ticket assigned.

| Temporary Roles with Replay Range-Table | | | | | |
|---|---|---|---|---|---|
| UserID | Role | Role Level | Provision Date | Deprovision Date | Replay Range |
| Sam (Server Admin) | HR-Admin | 4 | Apr. 1, 2023 | null | 1 month |

This replay range can be changed if they need to go back and gather more data. The reports and debugging queries can custom for each client but this logic should help control the access to the sensitive data. The use of the data model to control temporary escalated roles and limit the replay date range to a limited time period before the issue happened should allow developers and support team the access, they need to troubleshoot issues.

```
Select
If User_RoleLevel >= Column1_RoleLevel or (TemporaryUser_RoleLevel >= Column1_RoleLevel)
    Column1
Endif
If User_RoleLevel >= Colum2_RoleLevel or (TemporaryUser_RoleLevel >= Column2_RoleLevel)
    Column2
Endif
From Table
Where report filters condition = ??
--Using ReplayRange Check
And TransactionDate >= ProvisionDate - 1 month --Replay Range
```

This is also good for emergency access and the roles can be predefined and disabled with an end date entered in the DeprovisionDate. When using the model, you can easily report on the users that currently have access and there is no need to modify each and every report to add and remove access without the need to hardcode access and remove or comment out the access for the individual or temporary teams. This is not only good for server logging and to trouble shot report issues but also good for web content and data sharing within a portal for situational awareness for users when teaming with other departments or in the field traveling or working on a new site. This could be as simple as a deployed unit or a contractor working on a building and the local zoning and building codes of that area they are not normally assigned is displayed for their review.

The present invention expands the selection menu to include the roles the current user has access too for testing and a Watermark on the output report could include so the developer or server admins can know which role they were testing the time the report was created. The footer could include menu filters that may not display in the report title. This information is helpful when using escalated privileges and trying to compare multiple reports when testing trouble issues.

User Network Activity and Server Monitoring Issues

1. User Devices and Locations Secure Vs Unsecured

Figure 5A:
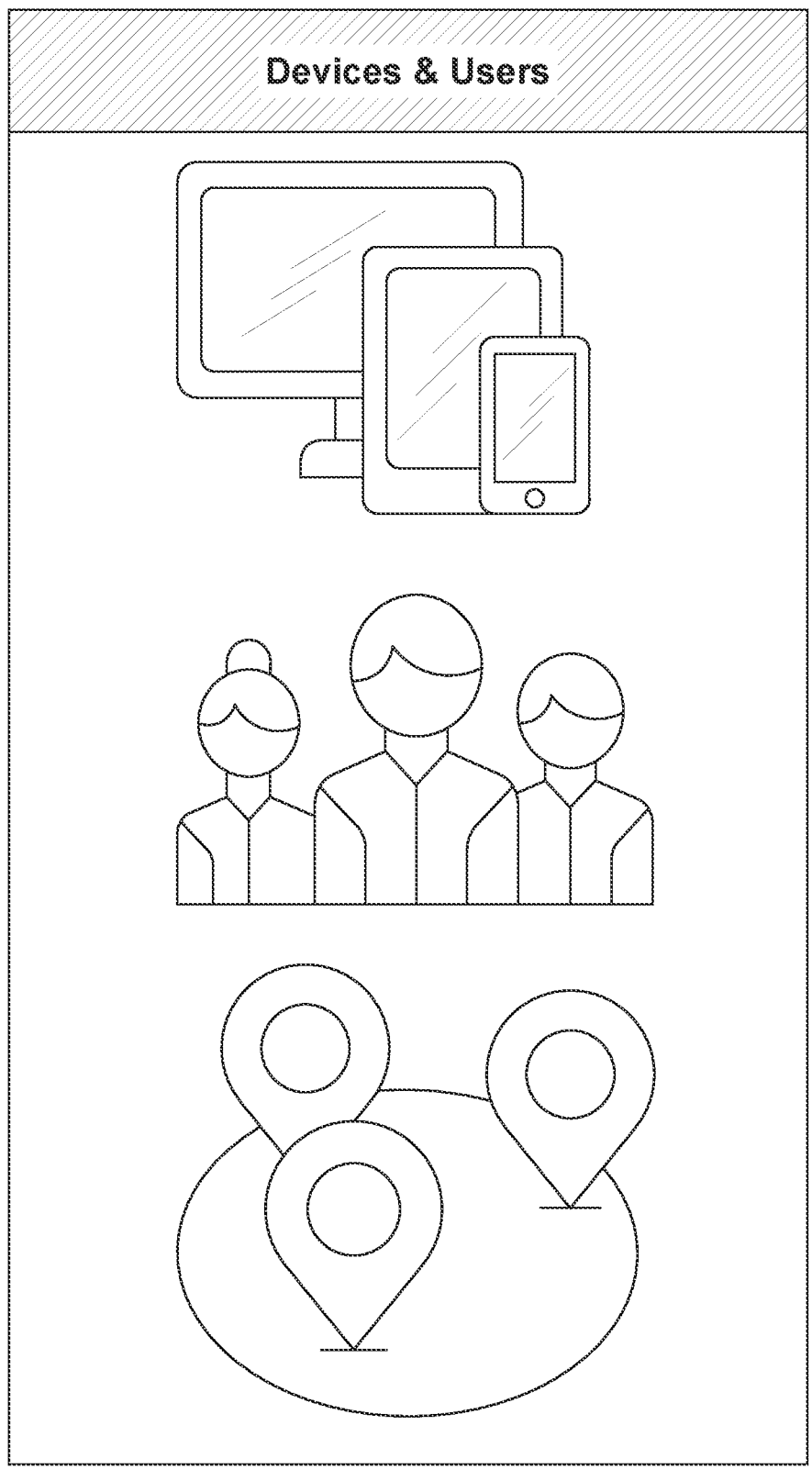
FIGS. 5A-5F are old method and issues labeled as prior art.

FIG. 5A There is a need to address user and device secure management for different user groups, devices, and locations. Secure and sensitive data needs to be protected when staff/developers are connecting from the office, telework, or public internet access which is an unsecured setting.

Standard User Roles do not Address Device or Location Security Levels

Standard role-based access controls do not completely handle the various devices or locations from which users access the web application. Moreover, application logs are hard to read and may not be strong enough to capture all the data needed for quickly resolving or addressing issues.

Figure 6A:
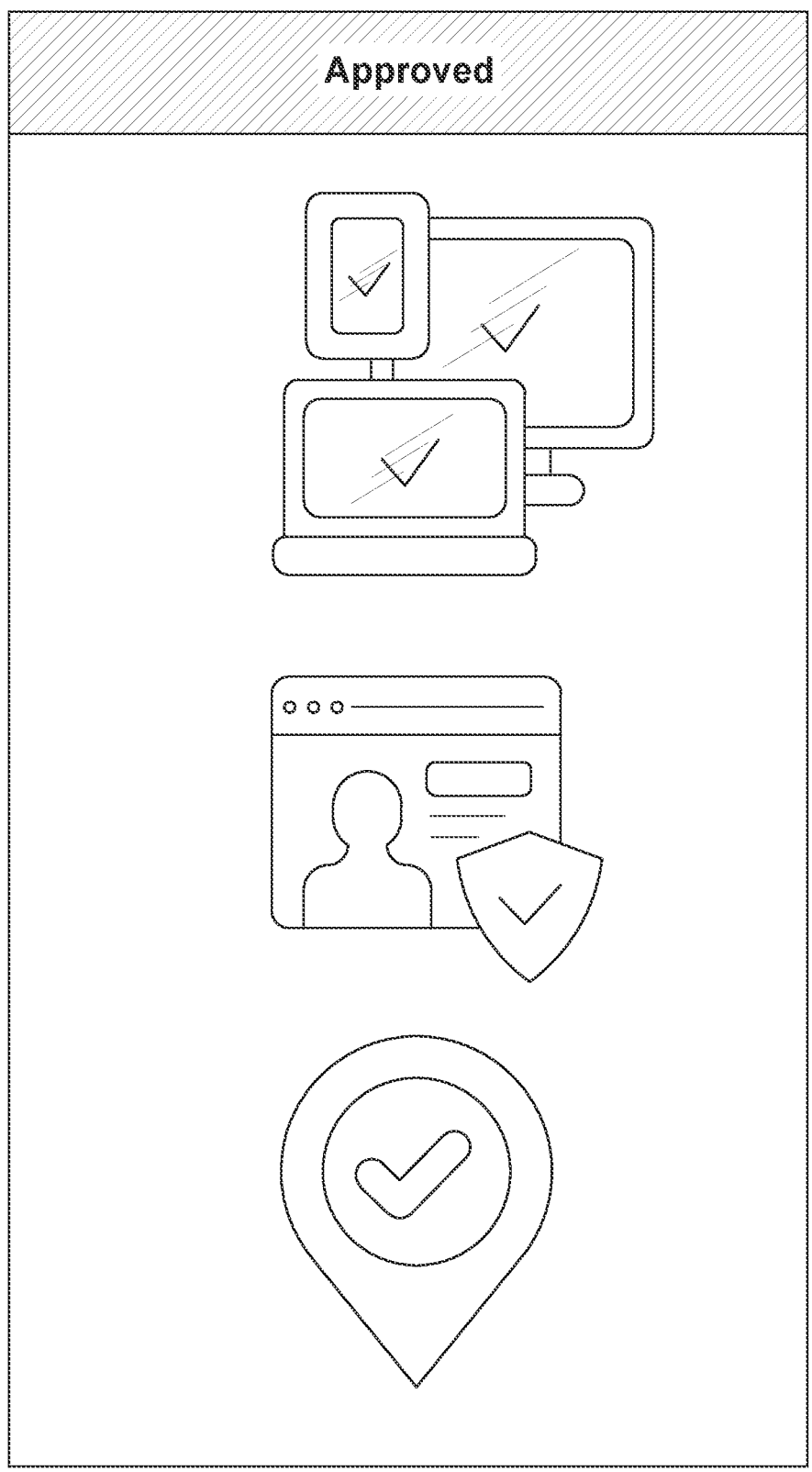
FIGS. 6A-6F are schematic views of exemplary embodiments of the present invention.

Solution:

FIG. 6A The present invention may enable creating a company approved device list. An administrator can manually enter the data using forms to enter information about network devices. A workflow is used to approve and assign the device a device trust group, based on IP zone and approved locations with different security trust levels. Role-based access controls are expended with the trust level of the device assignment and location. For more secure folders or page content, an example might be a higher-level security to protect and to restrict access to Admin pages of sensitive content.

Firewall configuration may also need to address custom ports in development or testing environments or admin applications. The firewalls can be set programmatically to limit access to a user's workstation or other network device based on IP address or computer name.

2. Network Mapping and User Activity Monitoring

Figure 5B:
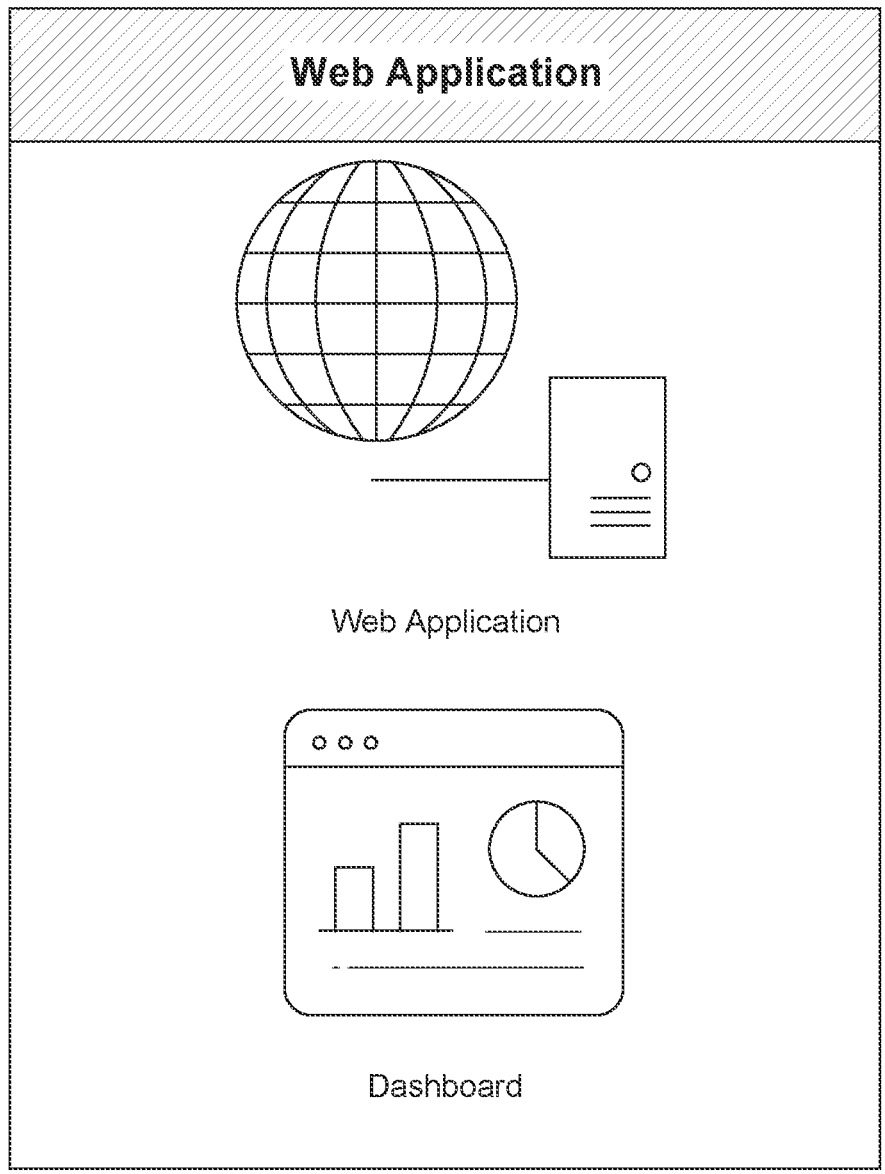
Figure 5C:
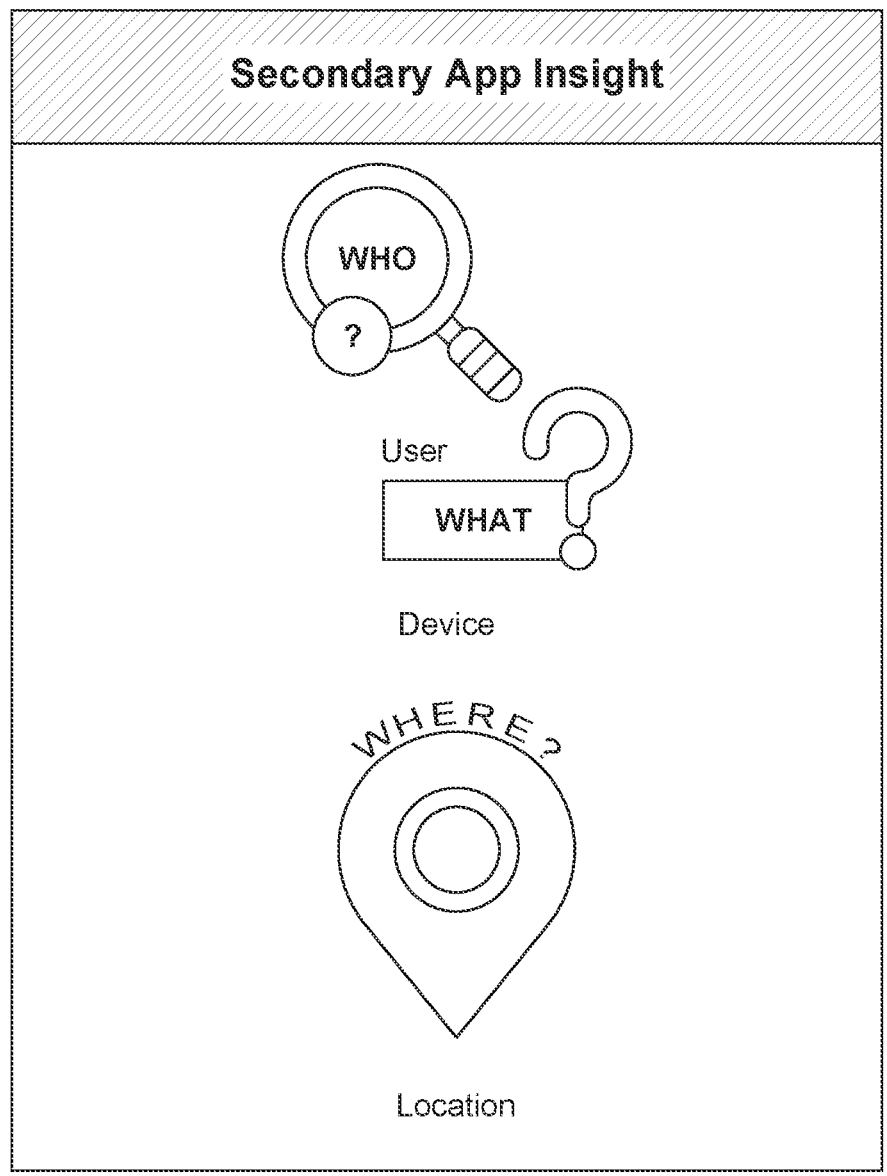

FIG. 5B and FIG. 5C Dashboards may connect many different reporting widgets or panels from different data sources and network end points. There needs to be user monitoring and access controls in place to address the network traffic of users to the sensitive data they are viewing or exporting from the Web Dashboard and secondary applications.

Figure 6B:
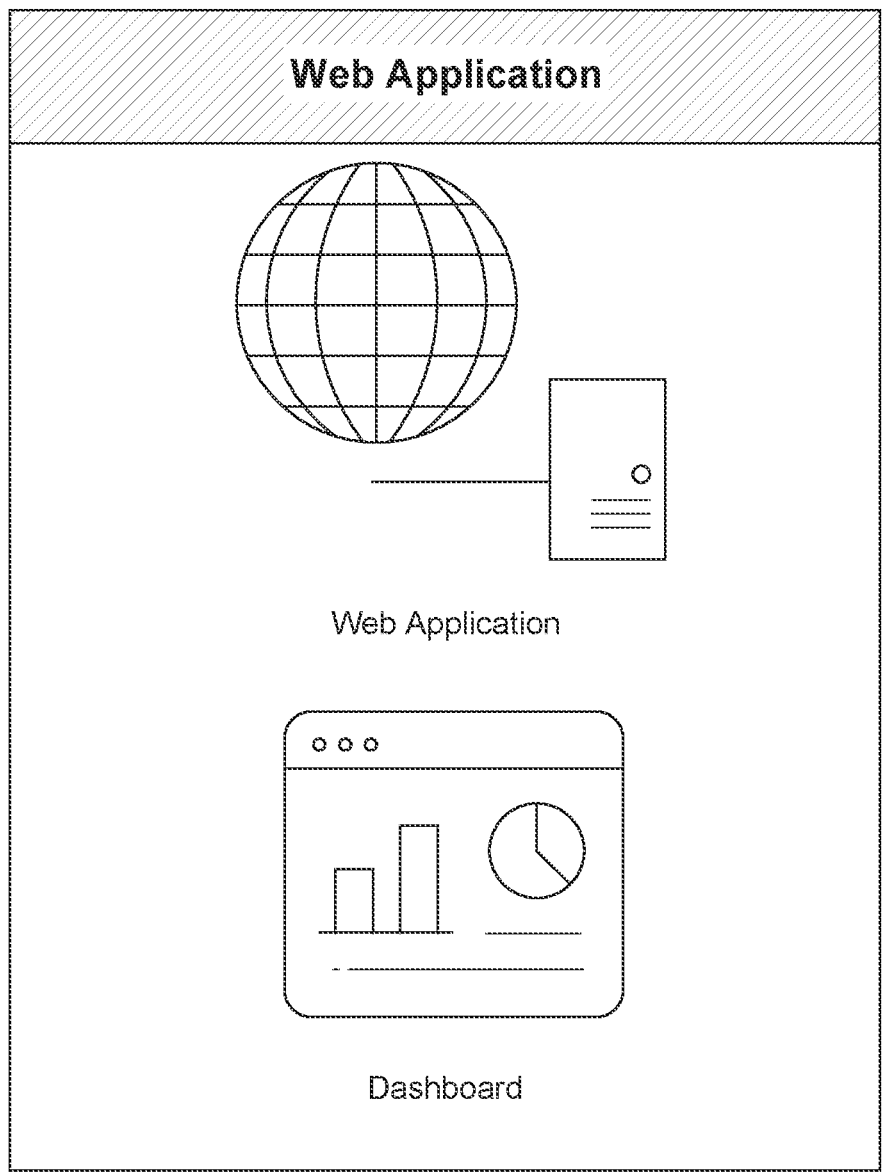
Figure 6C:
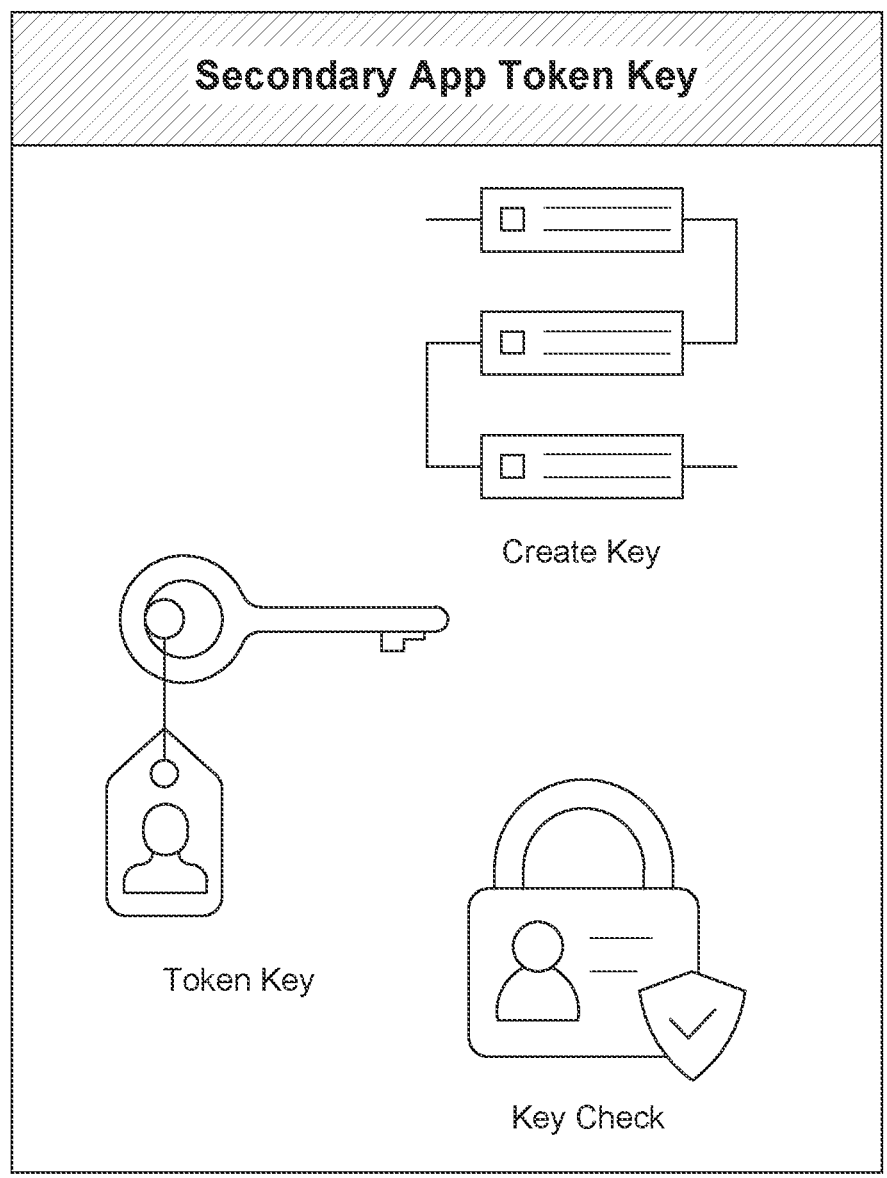

Solution:

FIG. 6B and FIG. 6C When an authenticated user connects to the Dashboard Web Server, a session token key is created. This session key is stored in a data table with the client's device's ip address and location information to restrict access to trusted levels of the web application.

3. Firewall Rules on Servers and Network Mapping

Figure 5D:
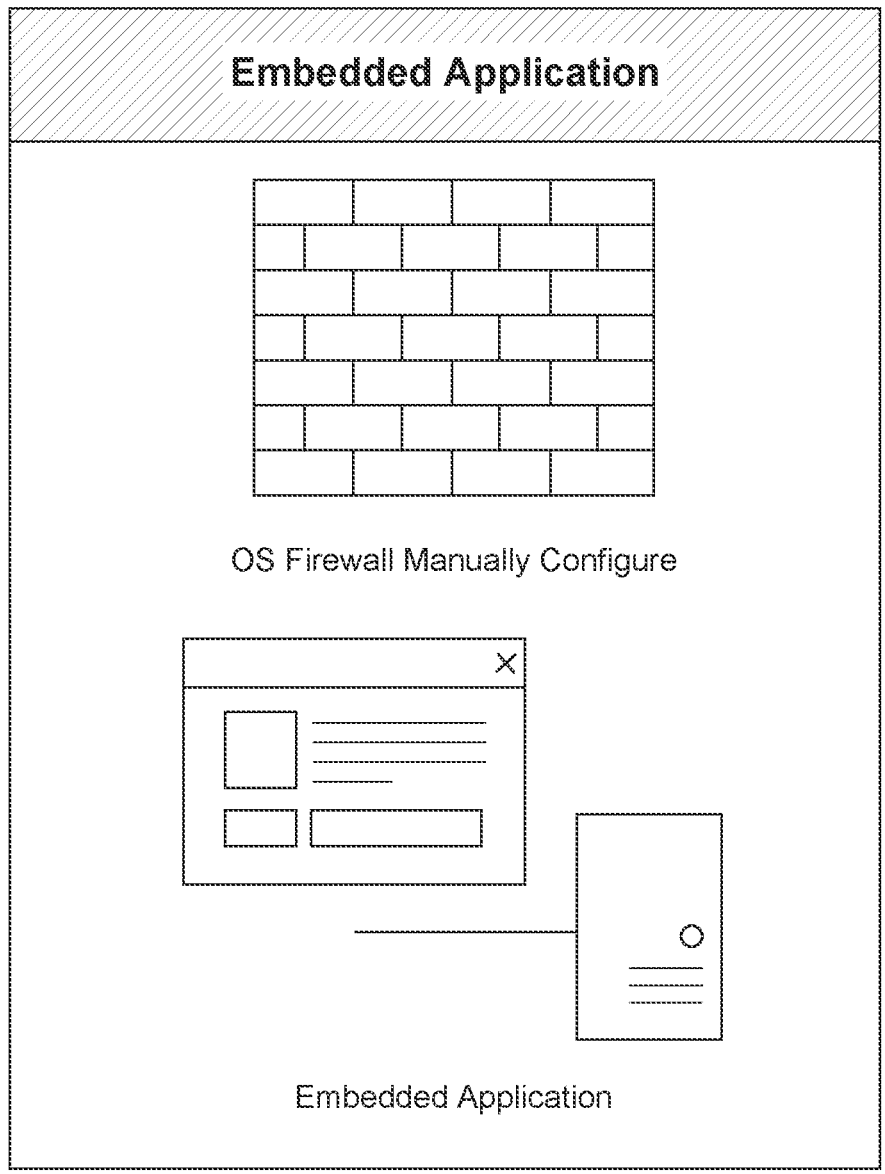

FIG. 5C and FIG. 5D Firewall settings on the Servers are manually set to open a port but do not allow lock the firewall down to an ip address to limit only the required devices needed to access it and can easily be misconfigured.

Solution:

The present invention is enabled to use an open-source network discovery tool, NMAP, to scans the network. The present invention is enabled to import the devices information from the network scan to be reviewed by administrators and Cyber teams. Devices are periodically scanned for approved software and other important information. Also, scripts can be run to gather information about the computers and devices. Examples would be a Windows Power Shell script that checks for Firewall and Installed Programs information or NMAP vulnerability scanning scripts and third-party compliance programs.

4. User Activity is not Always Captured

FIG. 5C The Embedded application normally does not have an insight into the end user's device or location from the primary Dashboard application. Application errors and access logs are not sufficient to precisely identify the problem.

Solution:

FIG. 6C The present invention enables creation and storage of session keys that we can encrypt and pass to the Secondary Embedded Application to log and identity user activity and event handling.

5. In Some Environments Network Tools do not Identify Multiple User Requests from the Dashboard to Embedded Widgets on the Secondary Application.

FIG. 5D The Web Application connects to the Secondary app, which uses an OS Firewall. This firewall is normally set to allow a port protocol for connection to the Secondary application. Network monitoring tools can see the traffic between the servers, but when multiple users are creating traffic, network monitoring tools fail to identify which user is creating each request.

Figure 6D:
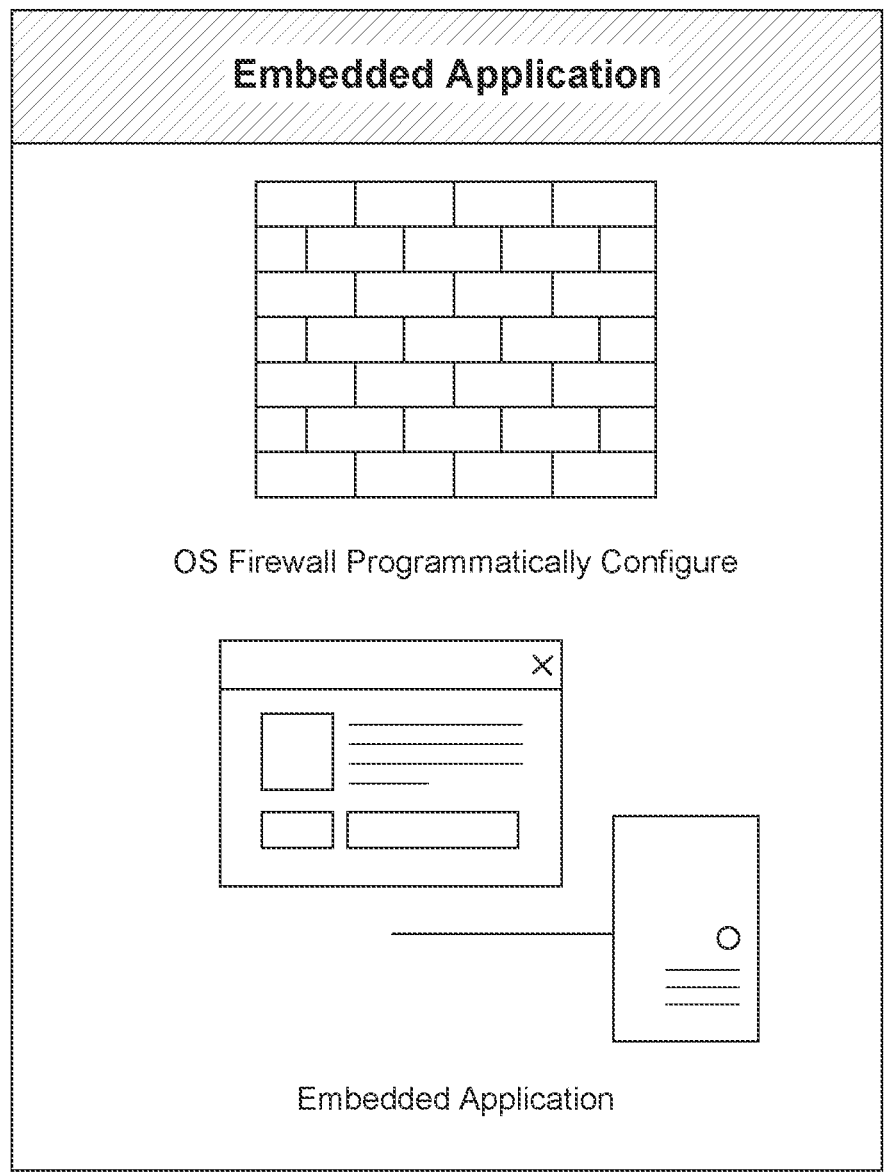

Solution:

FIG. 6D The Firewall Rules for the Secondary Embedded Application can be programmatically set as new servers are added or removed to only allow port traffic from the Dashboard applications or trusted devices. A Firewall Rules check process can be scheduled to report or disable rules that are not approved or need to be reviewed by staff.

6. Network Tools Capture IP Traffic

Figure 5E:
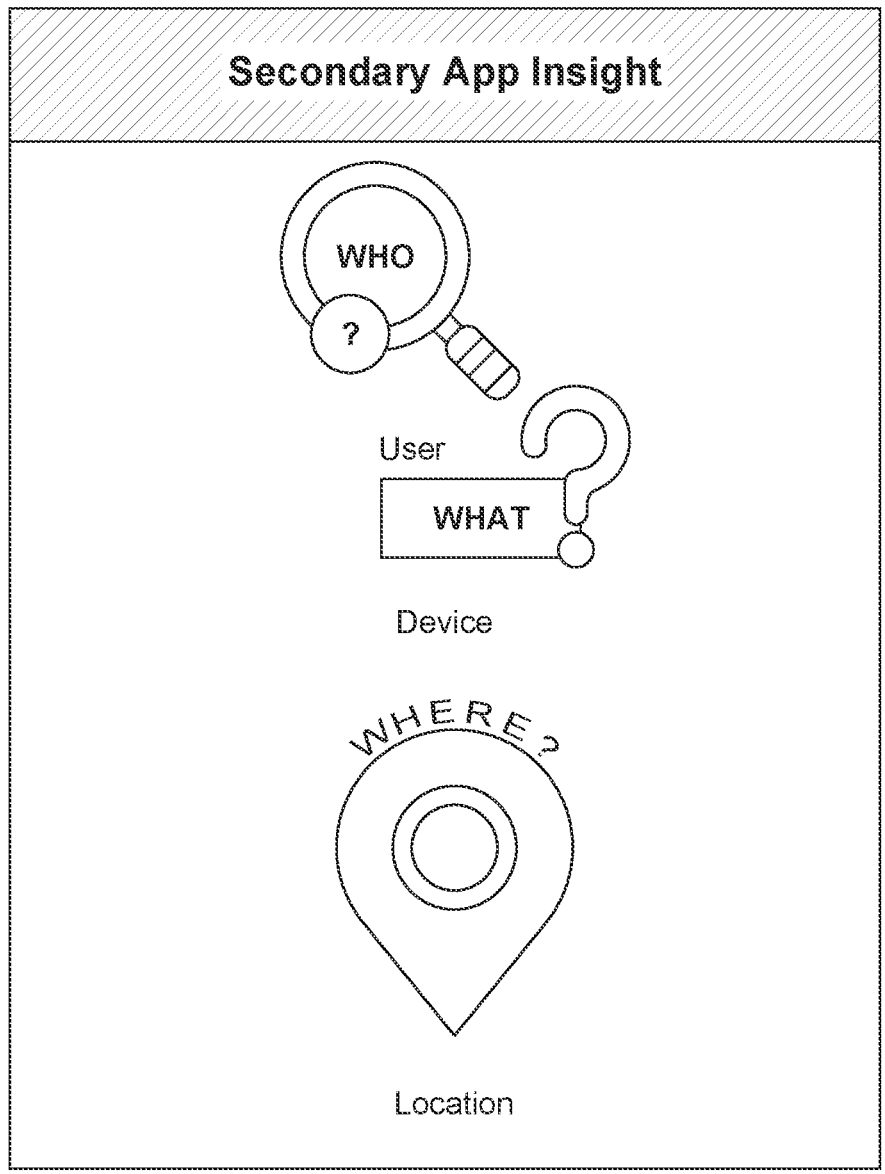
Figure 5F:
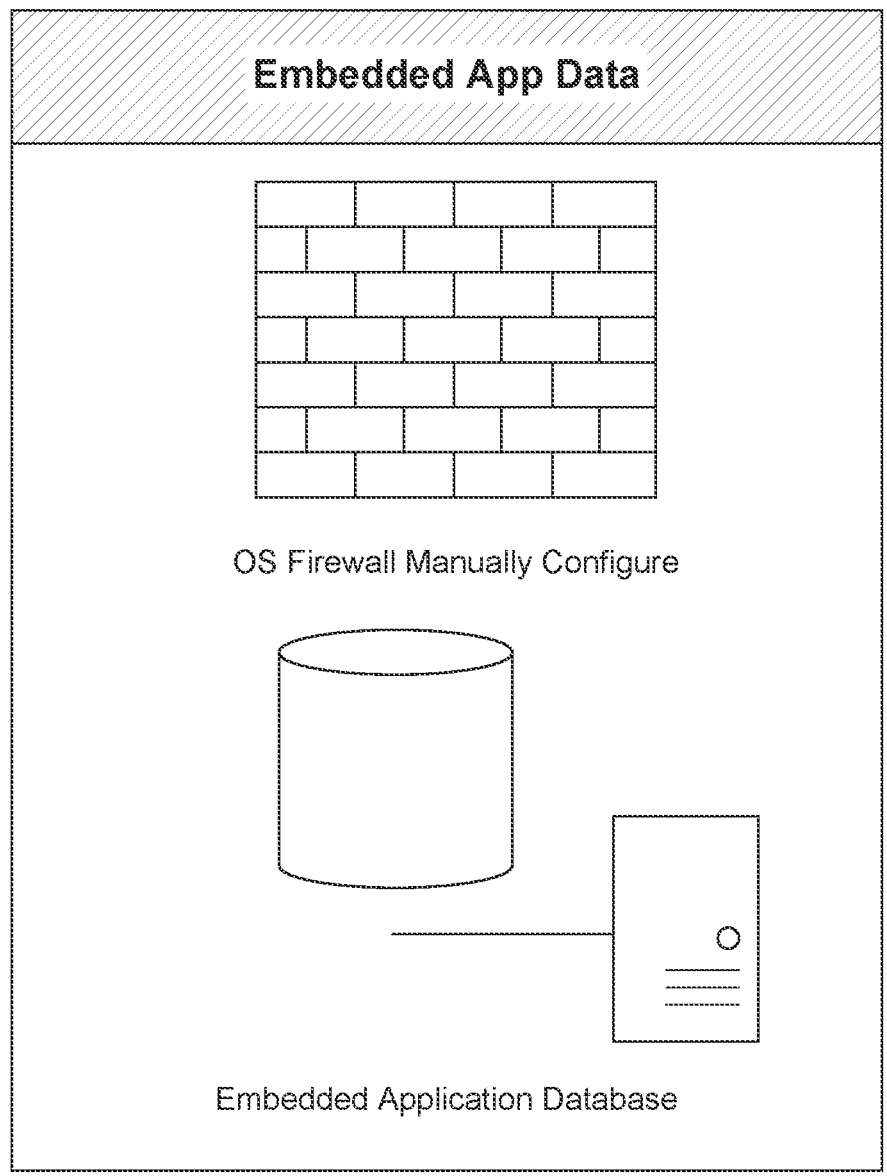

FIG. 5C and FIG. 5E Network monitoring tools can only capture the traffic between the user and the web server and see ip traffic traveling from the Web server to the Secondary server. The requesting server acts as a proxy for the user's request but does not pass the identity of the users.

Figure 6E:
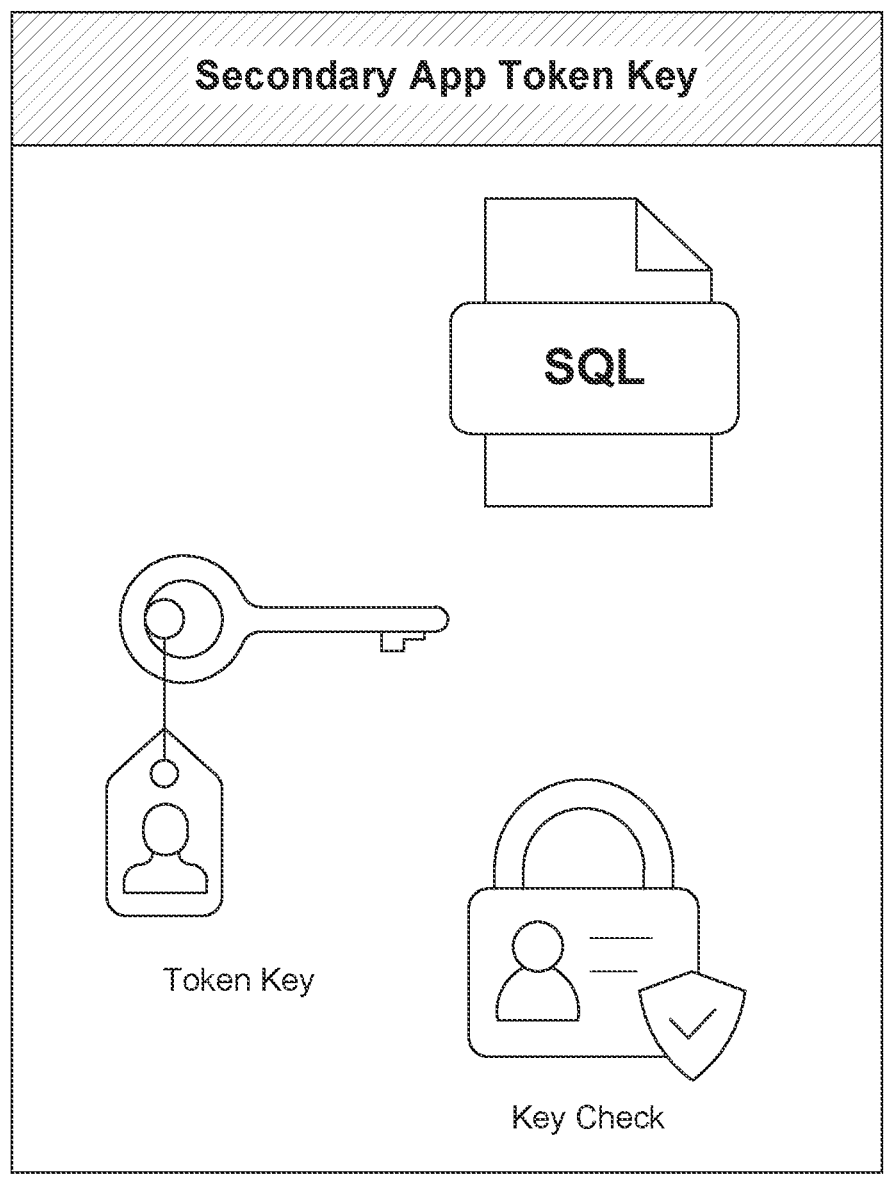
Figure 6F:
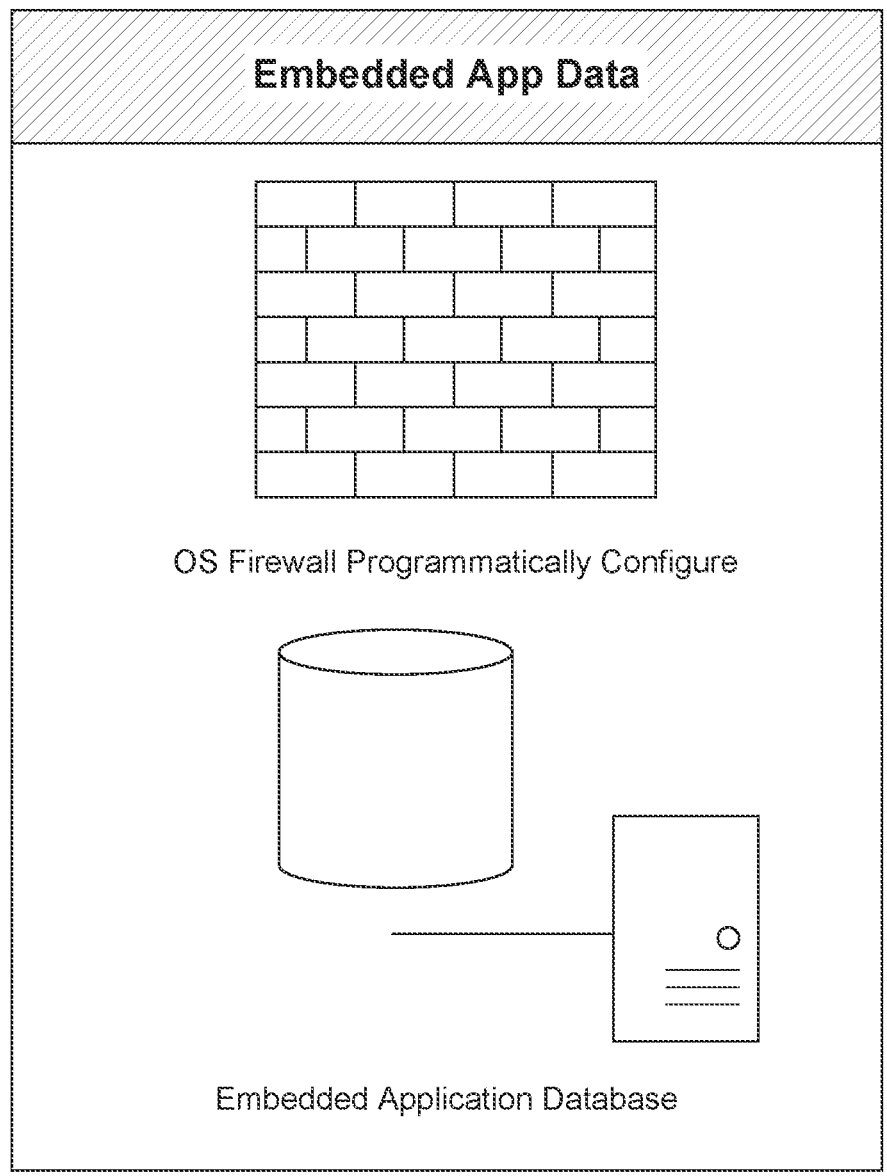

Solution:

FIG. 6C and FIG. 6E After the request has passed the firewall, the user's encrypted token is passed in the URL to the Embedded Application. That application can store the value on local logs or within the application's log repository and used to audit user activity.

6. Dashboard Acts as a Proxy and May not Pass User Authentication

FIG. 5C When the Dashboard employs an Embedded Application, the Secondary App might not directly authenticate the individual user. Instead, it utilizes the Dashboard for the request, and that connection gets authenticated by the Web Dashboard Application, effectively acting as a proxy for the user.

Solution:

FIG. 6C The Embedded Application decrypts the token with their key, that were described in the applicant's Key Store Patent, and queries the primary data store application to confirm the session is an activity session and matches the token information with the login query results.

This secondary check can see if the user is logged in with 2 sessions or from two devices or different locations etc.

7. The Secondary Database does not Know Who Sent the Request

FIG. 5E The secondary database gets a request secondary application server giving us no insight into which dashboard sent the request and which user is viewing the dashboard. Solution:

FIG. 6E What is different is the Embedded Application needs to tag the SQL it sends to the database. The application of the present invention has a format for creating query creation with variable tags the present invention is enabled to pass in the comments. An example is when MySQL logging to a table is turned on, the present invention is enabled to see the tagged variables for future parsing and querying of the user activity.

If the query needs to be restricted more, the end data source can pass the UserID and current role level information based on the device and the location to the Embedded data source application. Those filters for the query should be preset and set by the Embedded application.

With a predefined query tagging format and predefined variables, you can be assigned with a standard method for an enterprise user and device monitoring. This should help you as you implement Corporate Dashboards and Web content with Sensitive data from different data sources for multiple users, devices and locations.

When our queries, they are tagged with information that will identify each unique user so that we may track them in our database, audits, and database logs. In addition to tagging user activity in the database, escalated permission and restrict data per rollback period are implemented to allow administrators and developers to troubleshoot issues and teams to have temporary permission escalation on temporary projects.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, Mac-OS, Windows, Unix, OpenVMS, an operating system based on Linux, or any other appropriate operating system, including future operating systems. In some embodiments, the computing systems may be a web server running web server applications such as Apache, Microsoft's Internet Information Server™, and the like.

In particular embodiments, the computing systems include a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example, and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface may include hardware, software, or both providing one or more interfaces for communication between a person and the computer systems. As an example, and not by way of limitation, a user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface.

The communication interface includes hardware, software, or both providing one or more interfaces for communication (e.g., packet-based communication) between the computing systems over the network. As an example, and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

What is claimed is:

1. A method of creating a dashboard layout having report widgets or content widgets tailored for a plurality of systemic devices sharing a network, the method comprising:
electrically defining an internet protocol (IP) zone for each of the plurality of systemic devices sharing the network;
classifying a classification level for each data set of a plurality of data feeds that are being imported or joined from different levels of sensitive data;
assigning each systemic device a trust level based on the internet protocol (IP) zone in which the systemic device is located, wherein the trust level is also based on one or more roles of an associated systemic user; and
displaying on the systemic device the report widget or the content widgets modified based on the classification level and the trust level.

2. The method of claim 1, wherein data filtering to classify data sets is based on sensitivity levels.

3. The method of claim 1, wherein comments allow for entry and attachments of items along with date range and classification levels to alert surrounding groups within the zoom level rang of the events.

4. The method of claim 1, wherein mock data is used to help create widget sizing options and restrictions, for a widget option layout library for different layout versions along with version controls for testing.

5. The method of claim 1, wherein a Scalable Vector Graphic (SVG) library or a charting library processes topics filtered from the data sets during classifying the classification levels grouping and rendering sensitive data and charting elements supports.

6. The method of claim 1, wherein a plurality of elements and report widgets are stored with versioning information, and a report can be created for the user groups granted access to those elements.

7. The method of claim 5, wherein widgets and web elements shared within the SVG library or charting library allow internal or external teams with lower security levels to assist in the development of applications.

8. The method of claim 1, wherein zoom levels and data layer unique identifier (UID), along with other information, are stored within a table to create and control the security of embedded mapping tools with different security levels by map layers.

9. The method of claim 8, configuring for custom datasets to be used with JavaScript charting libraries and restricting applied security levels to the data sets being joined and filtered based on data classification used for classification levels, zoom level details, display device level, and IP zones, not just a user's role level.

10. The method of claim 9, wherein the zoom level allows other teams within the zoom level radius range to see the data of another team if the role mapping between teams is enabled.

11. The method of claim 1, wherein the systemic devices are linked to a location to allow for different presentation modes to be used based on the function of the device and the device's role, most dashboards use just the user's roles.

12. The method of claim 1, wherein shared element library allows the application teams to share web elements, data sets, and widgets to limit the full granting of access to their whole database or data feeds.

13. The method of claim 1, wherein testing form allows for the selection of widgets to be easily placed in panels and for filters and menus to be replaced with prior versions for testing.

14. The method of claim 1, wherein the query of the queries allows a user to join multiple data sources for a single widget, enabling compartmentalization.

15. The method of claim 1, further comprising scheduling a task to load the data or use dockers to distribute the work of extracting and creating our compartmentalized custom data model and data sets, such as different map layers, allowing for more real time data loads and/or preloading data to edge devices for teams, missions, or projects with low internet connectivity.

16. The method of claim 1, further comprising: implementing a network discovery to address the device on the network connecting endpoints for monitor traffic between servers.

17. The method of claim 1, wherein a device and location approved list are added to the role level list and assigned to users to create a complex rule set which will address the user access control at different locations and on different devices.

18. The method of claim 1, further comprising implementing one or more scripts to gather information about the server and workstations and firewall rules; and programmatically setting the one or more scripts when new access is required.

19. The method of claim 1, further comprising creating a user-token that incorporates and encrypts device and location information so that a secondary server or database can verify an authenticated user in a lookup table.

20. The method of claim 19, wherein the user-token is custom tagged in one or more application logs within the dashboard application and of secondary servers and database queries.

* * * * *